US012327093B2

(12) United States Patent
Alurralde Iturri et al.

(10) Patent No.: US 12,327,093 B2
(45) Date of Patent: *Jun. 10, 2025

(54) EXECUTING A PROCESS-BASED SOFTWARE APPLICATION IN A FIRST COMPUTING ENVIRONMENT AND A SECOND COMPUTING ENVIRONMENT

(71) Applicant: Oracle International Corporation, Redwood Shores, CA (US)

(72) Inventors: Fernando Alurralde Iturri, Foster City, CA (US); Ariel Cohen, Foster City, CA (US); Thomas Kauth, San Francisco, CA (US); Nicolas Damonte, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/062,333

(22) Filed: Oct. 2, 2020

(65) Prior Publication Data

US 2021/0034336 A1 Feb. 4, 2021

Related U.S. Application Data

(63) Continuation of application No. 15/647,096, filed on Jul. 11, 2017, now Pat. No. 10,831,453.

(Continued)

(51) Int. Cl.
*G06F 8/34* (2018.01)
*G06F 3/048* (2013.01)

(Continued)

(52) U.S. Cl.
CPC .............. *G06F 8/34* (2013.01); *G06F 3/048* (2013.01); *G06F 8/20* (2013.01); *G06F 8/35* (2013.01);

(Continued)

(58) Field of Classification Search
None
See application file for complete search history.

(56) References Cited

U.S. PATENT DOCUMENTS 8,321,535 B2 * 11/2012 Desai ..................... G06F 16/95
709/228
8,490,084 B1 * 7/2013 Alford ................ G06F 11/3688
717/177

(Continued)

*Primary Examiner* — Lewis A Bullock, Jr.
*Assistant Examiner* — Mark A Gooray
(74) *Attorney, Agent, or Firm* — Trellis IP Law Group, PC

(57) ABSTRACT

Process flow is created that represents a process-based software application. User specified connector creation information for creating connectors is received. User specified element information are received for associating elements with the process flow. One of the elements is a service task, and a connector is selected and configured from the connectors. The process-based software application is executed in a first computing environment. Interactions between the process-based software application and the connector framework are provided during the executing of the process-based software application in the first computing environment. The process-based software application is executed in a second computing environment. The process-based software application does not interact with the connector framework during the executing of the process-based software application in the second computing environment.

18 Claims, 13 Drawing Sheets

Related U.S. Application Data

(60) Provisional application No. 62/395,896, filed on Sep. 16, 2016.

(51) Int. Cl.
| | |
|---|---|
| *G06F 3/0481* | (2022.01) |
| *G06F 3/04847* | (2022.01) |
| *G06F 8/20* | (2018.01) |
| *G06F 8/35* | (2018.01) |
| *G06F 8/36* | (2018.01) |
| *G06F 8/38* | (2018.01) |
| *G06F 8/40* | (2018.01) |

(52) U.S. Cl.
CPC ................ *G06F 8/36* (2013.01); *G06F 8/38* (2013.01); *G06F 8/40* (2013.01); *G06F 3/0481* (2013.01); *G06F 3/04847* (2013.01)

(56) References Cited

U.S. PATENT DOCUMENTS

| | | | |
|---|---|---|---|
| 8,533,661 B2 * | 9/2013 | Nucci | G06F 8/10 717/105 |
| 2011/0131001 A1 * | 6/2011 | Mathur | G06F 11/3664 714/25 |
| 2013/0332899 A1 * | 12/2013 | Stewart | G06F 9/44505 717/121 |
| 2014/0130036 A1 * | 5/2014 | Gurikar | G06F 8/61 717/176 |

\* cited by examiner

EXECUTING A PROCESS-BASED SOFTWARE APPLICATION IN A FIRST COMPUTING ENVIRONMENT AND A SECOND COMPUTING ENVIRONMENT

CROSS REFERENCES TO RELATED APPLICATIONS

This application is a continuation of U.S. patent application Ser. No. 15/647,096, entitled CONNECTORS FRAMEWORK, filed Jul. 11, 2017 which claims priority from U.S. Provisional Patent Application Ser. No. 62/395,896, entitled CONNECTORS FRAMEWORK, filed on Sep. 16, 2016 (Trellis ref. ORACP0174P) which are hereby incorporated by reference as if set forth in full in this application for all purposes.

This application is related to the following applications: U.S. Provisional Application Ser. No. 62/395,883, entitled PRE/POST DEPLOYMENT CUSTOMIZATION, filed on Sep. 16, 2016 (Trellis ref. ORACP0171P/Client ref. ORA170300-US-PSP); U.S. patent application Ser. No. 15/647,059, also entitled PRE/POST DEPLOYMENT CUSTOMIZATION, filed on Jul. 11, 2017 (Trellis ref. ORACP0171/Client ref. ORA170300-US-NP); U.S. Provisional Application Ser. No. 62/395,876, entitled GENERIC-FLAT STRUCTURE REST API EDITOR, filed on Sep. 16, 2016 (Trellis ref ORACP0172P/Client ref. ORA170301-US-PSP); and U.S. application Ser. No. 15/647,082, also entitled GENERIC-FLAT STRUCTURE REST API EDITOR, filed on Jul. 11, 2017 (Trellis ref ORACP0172/Client ref. ORA170301-US-NP), which are hereby incorporated by reference as if set forth in full in this application for all purposes.

BACKGROUND

The present application relates to computing, and more specifically to software development and implementation tools, including interfacing mechanisms for coupling or connecting steps of a process-based software application to web services, Application Programming Interfaces (APIs), and/or other computing resources that are called by the steps.

Process-based software applications (e.g., as may be illustrated via Business Process Model and Notation (BPMN)) are employed in various demanding applications, including software for facilitating implementing business-related user tasks (e.g., approval tasks); extraction of specific data from distributed databases; leveraging of functionality provided by different web services and/or APIs running on different web servers, and so on. Such applications often demand efficient mechanisms for enabling process designers (also called developers herein) to quickly set up connections (also called integrations or interfacing mechanisms herein) between process steps and services or other functionality used by the steps, without requiring extensive technical knowledge or time-consuming manual coding of specific interface descriptions and associated service calls.

Conventionally, a developer of a process-based software application may manually code service calls for different process steps. In a particular example, a process step that calls a particular web service or API to extract current weather data from a weather database, must call the web service or API using a specific format and/or protocol consistent with a Web Application Description Language (WADL), Simple Object Access Protocol (SOAP), Yet Another Markup Language (YAML), REpresentational State Transfer (REST), or other type of interface description exposed by the web service or API.

However, such manual coding of service calls is often time consuming and may require technical expertise and knowledge. Furthermore, when the associated process-based software application is deployed to different environments, the service calls may require tedious recoding to account for differences in service endpoints and configurations.

SUMMARY

An example system and method facilitates developing and interacting with services or interfaces (i.e., connectors) to be implemented in a computing environment. The example method includes determining a universe of available connector types and characteristics; using a connectors framework to provide a standardized User Interface (UI) that enables accepting user-specified parameters usable to define any of the available service types; accepting one or more parameters as part of a connector description from the standardized (or generalized) UI in response to user interaction therewith; and automatically converting the connector description to a particular connector type as further specified via user interaction with the standardized UI.

The connector framework may enable process cloud services application designers to call and communicate with outbound services (i.e., using connectors to be deployed in a computing environment) in a seamless and similar way regardless of the service type, i.e., connector type. The user, e.g., developer or designer, may interact with the same UI to manage (e.g., create, edit, delete, etc.) any connector using similar experience, and browse and readily understand the types of structures required by a particular connector to exchange information.

The framework may communicate with specific editor modules and accompanying dialogs to facilitate customization and configuration of any connector for any applicable purpose. All of the connectors can also be configured using the same life cycle, and they can be automatically parameterized to use different data when running in the different environments.

Accordingly, certain embodiments discussed herein employ a connectors framework and accompanying connector functionality to facilitate tying steps of business processes to services called thereby. By providing a layer of abstraction (provided by the connectors framework) between steps in a process-based software application, and external services to be called thereby, application development and implementation is simplified.

A further understanding of the nature and the advantages of particular embodiments disclosed herein may be realized by reference of the remaining portions of the specification and the attached drawings.

DETAILED DESCRIPTION OF EMBODIMENTS

Figure 1:
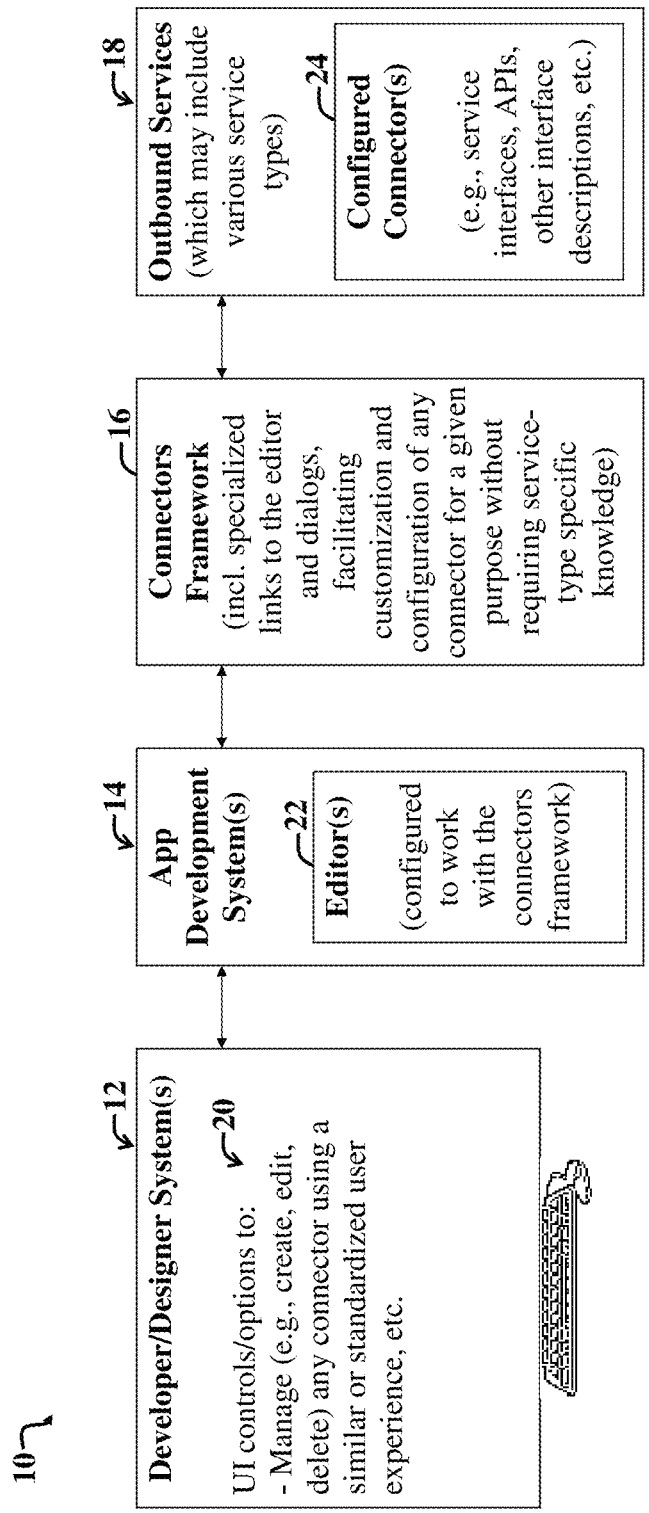
FIG. 1 is a first block diagram illustrating a first example system and accompanying computing environment that facilitates enabling users (e.g., developers, designers, etc.) to develop and interact with connectors (e.g., services, APIs, or other interfaces) to be implemented in the computing environment.

Conventionally, software developers, configuration managers, deployment managers, and other users of a computing environment may subscribe to certain cloud services to facilitate development, configuration, and deployment of software applications and storage of associated files. A cloud service that is configured for software application or process flow development, management, and/or deployment is called a Process Cloud Service (PCS) herein.

A process cloud service may employ a networked database to store files and other objects used by a given software program being developed. Server-side development environments may be accessible to developers via a browser. The development environments may be backed by the PCS, such that developed software application files are stored in the PCS database.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on. Examples of computing resources include data and/or software functionality offered by one or more web services, Application Programming Interfaces (APIs), etc.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

Certain embodiments discussed herein are particularly useful for development, deployment, and implementation of process-based software applications. A process-based software application may be any software application definable by one or more sequences of steps, also called process elements or software activities. The terms "process element," "flow element," "software element," and "software process element" may be employed interchangeably herein to refer to any step, e.g., event, activity, gateway, sub-process, and so on. A sequence of steps of a process-based software application may be called a process flow. Process flows are often modeled and illustrated via swim lanes in a User Interface (UI) display screen. Process-based applications are often implemented via composite applications that may leverage different web services for different process steps.

For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

A UI control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

For the purposes of the present discussion, a web service may be any computer code and associated functionality that is adapted to be called by an application or other service or process whose code is stored in a separate location (e.g., on another computer or memory storage location or device) from the web service. Accordingly, the term "service" as used herein is relatively broad and may include remotely accessible APIs and services characterized by Web Services Description Language (WSDL) interfaces, Simple Object Access Protocol (SOAP), REpresentational State Transfer (REST), YAML (Yet Another Markup Language), and/or other types of interfaces.

Generally, web services, also simply called services herein, provide functionality, e.g., capabilities, that may be reused by different applications, processes, or web services (that may be distributed across a network), which access the functionality via a service interface (e.g., WSDL interface) consistent with a description of the web service. A web services model may represent a loosely coupled integration model for allowing flexible integration of various network-distributed applications or processes.

Business process-based software applications are often modeled using Business Process Model and Notation (BPMN). Software development tools for enabling business users, developers, designers, and so on, may provide features for interacting with and/or manipulating BPMN graphical representations of the process-based software application during development of the application.

For the purposes of the present discussion, a software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

For clarity, certain well-known components, such as hard drives, processors, operating systems, power supplies, routers, Internet Service Providers (ISPs), workflow orchestrators, process schedulers, process clouds, business process management systems, and so on, are not necessarily explicitly called out in the figures. However, those skilled in the art with access to the present teachings will know which components to implement and how to implement them to meet the needs of a given implementation.

FIG. 1 is a first block diagram illustrating a first example system 10 and accompanying computing environment that facilitates enabling users (e.g., developers, designers, etc.) to develop and interact with connectors (that are associated with services, APIs, or other interfaces) 24 to be implemented in the computing environment.

From the perspective of a developer who is developing a process based software application using a developer/designer system 12, connectors 24 represent or are associated with outbound services 18, also called external services herein. The connectors 24 provide additional simplified mechanisms for enabling developers and other business users to readily understand, use, configure, manipulate, and deploy different types of web services and/or APIs that may be represented by the connectors 24.

The outbound services 18, also called external services herein, are said to be outbound, as they are to be deployed in a larger computing environment to interface different resources thereof. For example, a configured outbound connector 24 may be employed to handle communications between webpage code of a website and a backend database.

The overall system 10 may represent a networked computing environment, such as a networked enterprise computing environment. Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

For example, the connectors framework 16 may be alternatively shown as communicating with a catalog of connectors that stores the configured connectors 24 for use during development of a process-based software application. Furthermore, the configured connectors 24 may be shown separately from the web services 18 that connectors 24 interface with and call. In such case, the connectors 24 may be shown as separate abstractions or adapters (i.e., separate from but associated with the external services 18) for connecting process steps with associated external services 18, APIs, etc., via the exposed interfaces of the external services 18, as discussed more fully below.

For the purposes of the present discussion, a connectors framework may be any reusable set of data and/or software functionality for implementing one or more functions pertaining to connectors. Accordingly, a connectors framework may represent a type of software framework. Example functions pertaining to connectors include implementing tools to facilitate user construction, configuration, deployment, and use of connectors.

A connector may be any mechanism that facilitates interfacing or otherwise facilitates intercommunications between different software components and/or computing resources. Connectors discussed herein generally include added functionality over conventional software components used to make web service calls, where the added functionality may be visualized as a layer of abstraction that simplifies developer use of external services for implementing steps of process-based software applications.

For the purposes of the present discussion, software functionality may be any function, capability, or feature, e.g., stored or arranged data, that is provided via computer code, i.e., software. Generally, software functionality may be accessible via use of a user interface and accompanying user interface controls and features. Software functionality (often simply called functionality herein) may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

A software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an enterprise software application, displaying a dialog box, and so on.

The example system 10 includes one or more developer systems 12 in communication with the one or more application development systems 14. The application development systems 14 and connectors framework 16 may run on a server system, e.g., a process cloud, accessible to the client developer systems 12. The outbound services 18 that are accessed by process-based software applications using the configured connectors 24 may be external to such a process cloud, i.e., running on a different server system.

The application development systems 14 may provide an integrated development environment with one or more connector editors 22 that are configured to communicate with and link to the connectors framework 16. Note that the connectors framework 16 may also be implemented using a process cloud.

The connectors framework 16 includes computer code for providing a layer of abstraction for use by the editors 22 and developer systems 12 upon which UI display screens 20 of the editors 22 are rendered. Examples of UI controls 20 that may be rendered via the developer systems 12 include UI controls to manage (e.g., create, edit, delete, etc.) any connector of a supported connector type via a similar user experience. A developer, business user, or other user (e.g., administrator, configuration manager, etc.) of the developer systems 12 may readily interact with the editors 22 and associated connectors framework 16, connectors 24, and associated services 18, without requiring specialized knowledge of different available connectors and associated connector types.

Figure 2:
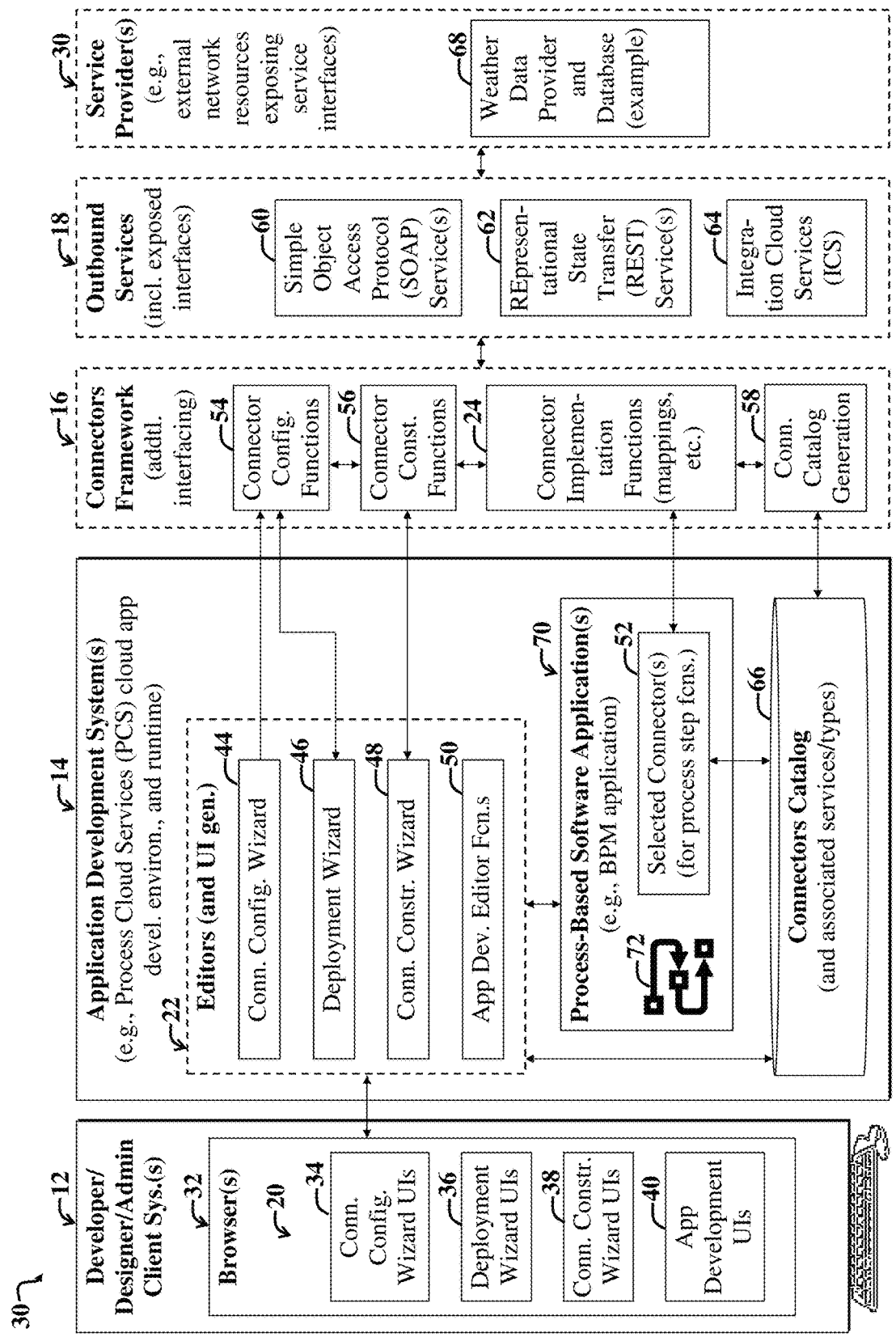
FIG. 2 is a second block diagram illustrating additional detail for an example implementation of the system of FIG. 1, including tools for developing a process-based software application that selectively uses external computing resources and associated web services via associated connectors supported by a connectors framework.

FIG. 2 is a second block diagram illustrating additional detail for an example implementation of the system of FIG. 1, including tools 44-50 for developing a process-based software application 70 that selectively use external computing resources 30 and associated web services 18 via associated connectors 52 (that may be stored in the connectors catalog 66 for use with the process-based software application 70) supported by a connectors framework 16.

In the present example embodiment, the developer systems 12 (also called user systems or client systems) include browsers 32. The browsers 32 enable users to browse to a website for accessing and using data and functionality provided by the application development systems 14. The data and functionality available to the developer client systems 12 via the application development systems 14 and connectors framework 16 may be hosted on a process cloud that may include one or more web servers and application servers.

Examples of UI controls and UI features 20 that may appear in (or otherwise be user accessible via) the browser 32 include connection configuration wizard UI display screens 34; connector deployment wizard UI display screens 36; connector construction wizard UI display screens 38; application development UI display screens 40, and so on.

The server-side application development system(s) 14 include connector editor software 22. In the present example embodiment, the connector editors 22 leverage various types of connector functionality to generate UI display screens 20 to enable developers and other users to access connector-related functionality. The connector-related functionality includes functionality provided by a connector configuration wizard 44, a connector deployment wizard 46, a connector construction wizard 48, and an application development editor 50 (e.g., BPMN editor).

The connector configuration wizard 44 has access to and uses, i.e., leverages, various connector configuration functionality 54 afforded by the connectors framework 16 to enable rendering of the client-side connector configuration wizard UIs 34 and implementing associated functions. Examples of functions that may be facilitated by the connector configuration wizard 44 and accompanying UIs 34 include changing security parameters and associated credentials for a connector; changing an endpoint Uniform Resource Locator (URL) that identifies the external service to be connected to using the connector; changing connector timeout settings, etc.

Similarly, the connector deployment wizard 46 is also shown communicating with connector configuration functionality 54 provided by the connectors framework 16. The connector deployment wizard module 46 includes computer code for generating deployment wizard UI display screens 36 for use by a developer or other user (e.g., deployment manager) of the client-side systems 12. Connector configuration functions 54 that the deployment wizard 46 may use include selecting different deployment environments; configuring process-based software applications and associated connectors to use resources in the target deployment environment, e.g., by adjusting specifications of endpoints, connector parameters, and so on.

The connector construction wizard 48 uses connector construction functions 56 supported by the connectors framework 16 and generates rendering instruction and associated UI controls for the client-side connector construction wizard UI display screens 38. Functions used to generate or create a connector include specifying particular web service endpoints, resources to access at the endpoints, operations to perform, types of data send to the web service; types of data to be received; in addition to specifying initial configuration parameters, such as timeouts, security parameters and types; connector name, etc.

Note that the connector construction functions 56 may communicate with and use the connector configuration functions 54 of the connectors framework 16. Furthermore, the connector construction functions 56 may further communicate with and use connector implementation functions 24 of the connectors framework. Examples of connector implementation functions include a mapping function for performing mappings of WADL structures into flat REST structures for use by the editor software 22 when constructing and/or editing a REST API connector; converting the flat REST structure into a hierarchical WADL interface definition for the connector upon saving the connector in the connectors catalog 66, and so on.

Once a particular connector has been constructed, e.g., in response to developer interaction with the client-side connector construction wizard UI display screens 38, it is made available to application development editor functionality 50, via a connectors catalog 66 in which the connector is saved. The connectors catalog 66 may be generated, in part by the connectors catalog generation module 58 of the connectors framework 16. The connector catalog generation module 58 may use connector mapping functions provided by the connector implementation module 24 to ensure that stored connectors in the connectors catalog 66 exhibit the appropriate format (e.g. WADL) for the services to which the connectors are to facilitate connecting process steps to.

The application development editor 50 includes functionality for generating client-side application development UI display screens 40. The application development UI display screens 40 include UI controls for interacting with a process-based software application 70 under development (or being edited). The example process-based software application 70 is characterized by a Business Process Model and Notation (BPMN) representation (also called a flow herein) 72, which may be displayed and manipulated via the client-side the application development UI display screens 40.

In the present example embodiment, a process developer (who need not have substantial expertise, e.g., who may be a business user or other BPMN flow designer) has employed the application development editor functions 50 to build the process-based software application 70 represented by the BPMN model flow 72. The process-based software application 70 includes one or more different steps, where each step represents a flow element, e.g. activity or other step. One or more steps of the flow 72 have been associated with one or more selected connectors 52, which shall be used to facilitate implementing the activity or step (by calling the service or API interfaced by the connector) upon deployment of the process-based software application 70. When deployed, the process-based software application 70 may use the connectors 52 to call associated external services 18, using connector implementation functions 24 of the connectors framework 16 as needed to map or translate communications between the connectors 52 (for different steps of the flow 72) and associated services 18.

The selected connectors 52 are selected by a process developer (e.g., business user) from the connectors catalog 66. After and/or before assigning a connector to a particular process step of the flow 72, the user may optionally further configure the connectors, e.g., using the connector configuration wizard 44. A deployment manager may then use the deployment wizard 46 to deploy the application to a particular environment, e.g., production environment. Examples of possible production environments include a sales cloud, a Human Capital Management (HCM) cloud, etc.

For illustrative purposes, the connectors framework 16 is shown interfacing the external services 18 with the application development systems 14. Before deployment of the process-based software application 70, a developer working on the process-based software application 70 (e.g., assigning connectors to different process steps, etc.) may visualize or conceptualize the connectors framework 16 as providing a layer of abstraction between the external services and the process-based software application 70.

The selected connectors 52 and their associated functionality may be visualized as being implemented by the connectors framework 16 and used to translate communications and data (e.g., implemented via the connector implementation functions 24) between steps of the process based software application 70 and data and functionality offered by the called external services (e.g., web services and/or APIs). In this way, the connectors framework 16 and associated connectors 52 provide a simplifying layer of abstraction, enabling developers to work with a simplified standard connector interface to create connectors to facilitate connecting process steps of their flow 72 to external services 60-64 as needed to meet the needs of step of the process-based software application 70.

The external services 18 may in turn (e.g., in response to a call from a process step via a connector of the process step) access back end computing resources and/or functionality, e.g., a weather data database 68 of the service providers 30.

Note however, that while the connectors 52 are shown separately from the external services 18 to which they connect steps of the process-based software application 70, that such connectors 52 may be visualized or conceptualized as representing the external services 18, as they are functionally coupled thereto or otherwise associated therewith.

Note that in certain implementations, the application development systems 14 are implemented using a process cloud, which includes its own test environment and runtime. The process-based software application 70 may be deployed to a test environment running on a process cloud supporting the connectors framework 16.

Note that interconnections between the modules 24, 54-58, of the connectors framework 16 are illustrative and may vary. Furthermore, additional modules may be included. For example, a framework controller module may facilitate intercommunications between the modules 24, 54-58, such that any one of the modules may communicate with another module.

After deployment, the way the connectors framework 16 and associated application development systems 14 operate relative to the process-based software application 70 may change. For example, when deploying the process-based software application 70, connectors 52 selected to facilitate implementing the process flow 72 may be packaged with other code and data for implementing the process-based software application 70. Code defining the selected connectors 52 may become part of the deployed software application. The deployed connector code may continue to act as a layer of abstraction between core code of the process-based software application and called services 18 and associated interfaces. However, in certain implementations, after deployment, the deployed application may run on its own, without requiring interaction with the application development systems 14 and certain functions (e.g., functions 54, 56, etc.) of the connectors framework 16.

Nevertheless, in certain embodiments, the application development systems 14 and accompanying connectors framework 16 may continue communications, as needed, with deployed applications. In such cases, the connectors framework 16 may facilitate so-called hot updates to connectors of deployed applications. A deployment manager using the deployment wizard 46 may access hot updating functionality of the connector configuration functions 54. The hot updating functionality may be implemented via Web Logic Server (WLS) API that leverages Java Management eXtensions (JMX) as part of deployment manager functionality of the configuration functions 54.

Figure 3:
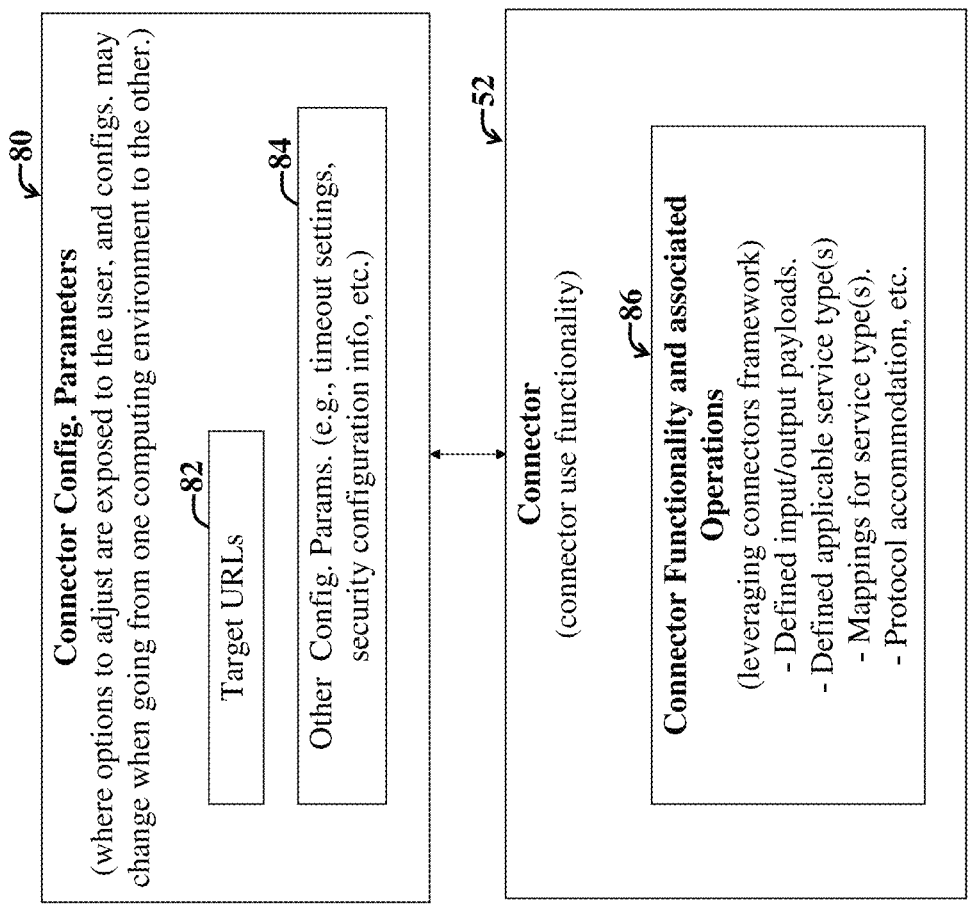
FIG. 3 is a third block diagram illustrating an example connector usable as an abstraction layer between a process step of a process-based software application and an external service of FIG. 2.

FIG. 3 is a third block diagram illustrating an example connector 52 and associated configurable parameters 80. The connector 52 (as may be implemented via the connectors framework 16 of FIG. 1) is usable as an abstraction layer between a process step of a process-based software application, such as the application 70 of FIG. 2, and an external service 18 of FIG. 2.

In the present example embodiment, the connector configuration parameters 80 are shown separately from the associated connector 52. However, the configuration parameters 80 may be considered to be part of the connector 52, without departing from the scope of the present teachings.

Examples of connector configuration parameters include target URLs 82 (e.g., identifying service endpoint addresses), and other configuration parameters 84, e.g., timeout settings, security configuration type specification, security credentials corresponding to the configuration type, and so on.

Note that the connector configuration parameters 80 may be stored as part of a configuration model for a particular process-based software application that uses the connector configuration parameters 80. The configuration model can then be accessed when using connectors framework functionality (e.g., the connector configuration functions 54 of FIG. 2) to modify the connector configurations for the process-based software application.

Accordingly, when an application and associated connector(s) 52 are deployed to a particular computing environment, e.g., a production environment, then the connector configuration parameters 80 may be altered by a deployment manager to account for differences in how services are to be consumed in the new deployment environment (as opposed to how the services were consumed in the test environment).

Note that in general, connectors and/or associated services expose operations 86 that a user (e.g., developer) can leverage when developing a flow 72 for a process-based software application 70 of FIG. 2. The user simply picks an operation (corresponding to a particular connector(s) 52 of FIG. 2) from among the connectors catalog 66 for use in performing duties for a particular process step. The duties include communicating with an external service to access data and/or functionality afforded by one or more resources of the external service called by a process step using the associated connector.

Core connector use functionality 86 may leverage the connectors framework 16. Examples of connector functionality 86 include defining input and output payloads for a process step; defining applicable service types usable with the connector; implementing mappings or translations of messaging (e.g., protocol translation, file type translation, business object serialization and/or deserialization, etc.) between a process step and a service called by the process step using the connector, and so on.

Figure 4:
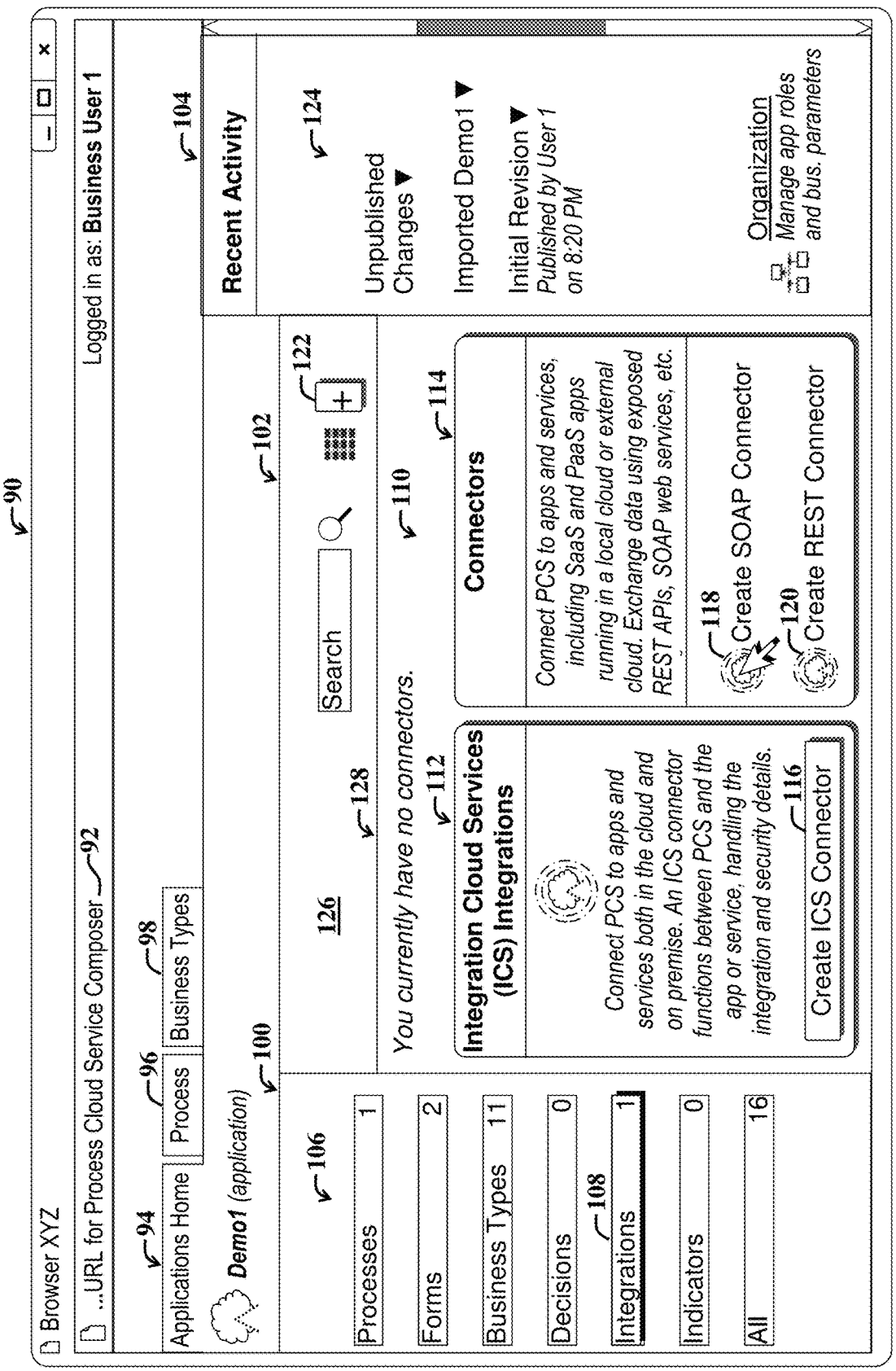
FIG. 4 shows a first example UI display screen that may be displayed using the developer system 12 of FIG. 1, and which illustrates UI controls and features for adding connectors to a developer's collection of connectors for use by a process-based software application under development.

FIG. 4 shows a first example UI display screen 90 that may be displayed using the developer system 12 of FIG. 1, and which includes various UI controls and features 100-122 for adding connectors to a developer's (e.g., "Business User1's") collection of connectors for use by a process-based software application under development (e.g., named "Demo1" in the present example embodiment).

The first example UI display screen 90 represents browser window, e.g., as may be displayed in the browser 32 of FIG. 2. The user (also called developer or designer herein) has entered a URL 92 to browse to a website for accessing the application development systems 14 of FIG. 2, which may correspond to a Process Cloud Service (PCS) composer, designer, or other development environment. The UI display screen 90 shows example tabs 94-98, including an applications home tab 94, a process tab 96, and a business types tab 98. The applications home tab 94 is currently activated.

A left portion of the applications home tab section 94 includes an artifacts section 100 with various controls 106 (which may act as additional sub-tabs of the applications home tab 94) for accessing additional UI display screens pertaining to various artifacts relevant to process-based software application development, e.g., processes, forms, business types, decisions, integrations, indicators, etc. An integrations control 108 is shown currently activated, resulting in display of an adjacent integrations section 102. A recent activity section 104 (that is adjacent to the integrations section 102) provides information and UI controls 124 for enabling the user to track and selectively access information pertaining to recent software development activities.

The example integrations section 102 includes a toolbar section 126 and a connectors section 128. The connectors section 128 includes various connector UI controls 110 for creating and/or adding different types of connectors to a collection of connectors, as discussed more fully below. Once connectors are created and/or added to the collection, representations of the added connectors may be displayed in the connectors section 128. Currently, no connectors have been created and added to the user's integrations collection, which is accessible via the integrations control 108 of the artifacts section 106 after connectors have been added to the collection.

The example connector UI controls 10 are separated into two sub-sections 112, 114, including an Integration Cloud Services (ICS) connector section 112 and a general connectors section 114. The ICS connector section 112 includes an ICS control 116 for enabling a user to access additional UI display screens (e.g., corresponding to a connector construction wizard 48 of FIG. 2) for creating and/or otherwise selecting and adding an ICS-type connector to the integrations section 128 and corresponding connector collection.

For the purposes of the present discussion, an ICS connector may be any connector for facilitating communications between a process-based software application and a custom (or other) web service or API that does not necessarily conform to conventional SOAP or REST standards. An ICS connector facilitates interfacing process-based software applications with the custom (or other) service. Note that underlying functionality and parameters needed to create an ICS connector may vary depending upon the needs of a given implementation, e.g., depending upon details of the interface exposed by the custom service. The details may include, for example, what protocols are used to communicate with the custom ICS-type service; how calls (e.g., request messages) to the ICS-type service are to be formatted; what types of data are to be returned by the ICS-type service, and so on. Those skilled in the art with access to the present teachings may readily develop and implement software for implementing specific ICS connector creation and implementation functionality, without undue experimentation.

The general connectors section 114 includes UI controls 118, 120 for creating SOAP-type connectors (also simply called SOAP connectors) and REST-type connectors (also simply called REST connectors) to facilitate connecting steps of a process-based software application to particular service types, e.g., SOAP services and REST services or APIs.

For the purposes of the present discussion, a connector type may be any category of connector, where the category is a function of the type of service that the connector is used to connect to. The type of service may be identified, in part, by which computing standards that the exposed interfaces of the services conform to, e.g., SOAP or REST standards. For example, a SOAP service may expose a WSDL or other type of SOAP interface, whereas, a REST connector may expose a WADL or other type of interface usable for REST services or APIs.

The SOAP connector control 118 represents user option for displaying and accessing additional UI display screens with additional controls for facilitating creation and/or selection of SOAP connectors for adding to the integrations section 128 (i.e., developer's collection of connectors). The additional UI display screens may be presented as a connector construction wizard (e.g., corresponding to the connector construction wizard functionality 48 of FIG. 2), as discussed more fully below.

Similarly, the REST connector control 120 represents a user option for displaying and accessing additional UI display screens for facilitating creation and/or selection of REST connectors for adding to the integrations section 128. The additional UI display screens may implement a connector construction wizard with UI controls and features for implementing REST connectors.

The toolbar section 126 includes additional UI controls, e.g., an add button 122. User selection of the add button 122 may trigger display of an alternative UI that enables user access to functionality for adding existing connectors to the connectors section 128. Note that connectors that have been created and collected by other users may be stored in a globally accessible connectors catalog (e.g., the connectors catalog 66) of FIG. 2. The catalog 66 of FIG. 2 may be searched for available connectors that meet the search criteria. Found connectors may then be selectively added to the connector collection maintained in the connectors section 126.

Note that while UI controls 116-120 are shown providing options to create three different types of connectors (i.e., ICS, SOAP, and REST), embodiments are not limited thereto. For example, certain implementations may provide fewer or additional options than shown for creating connectors. Controls for creating connectors of different connector types (e.g., other than ICS, SOAP, or REST connectors) may be provided. Furthermore, options for creating certain connector types may be omitted. For example, certain implementations may omit the ICS integration-creation option 116, without departing from the scope of the present teachings.

Figure 5:
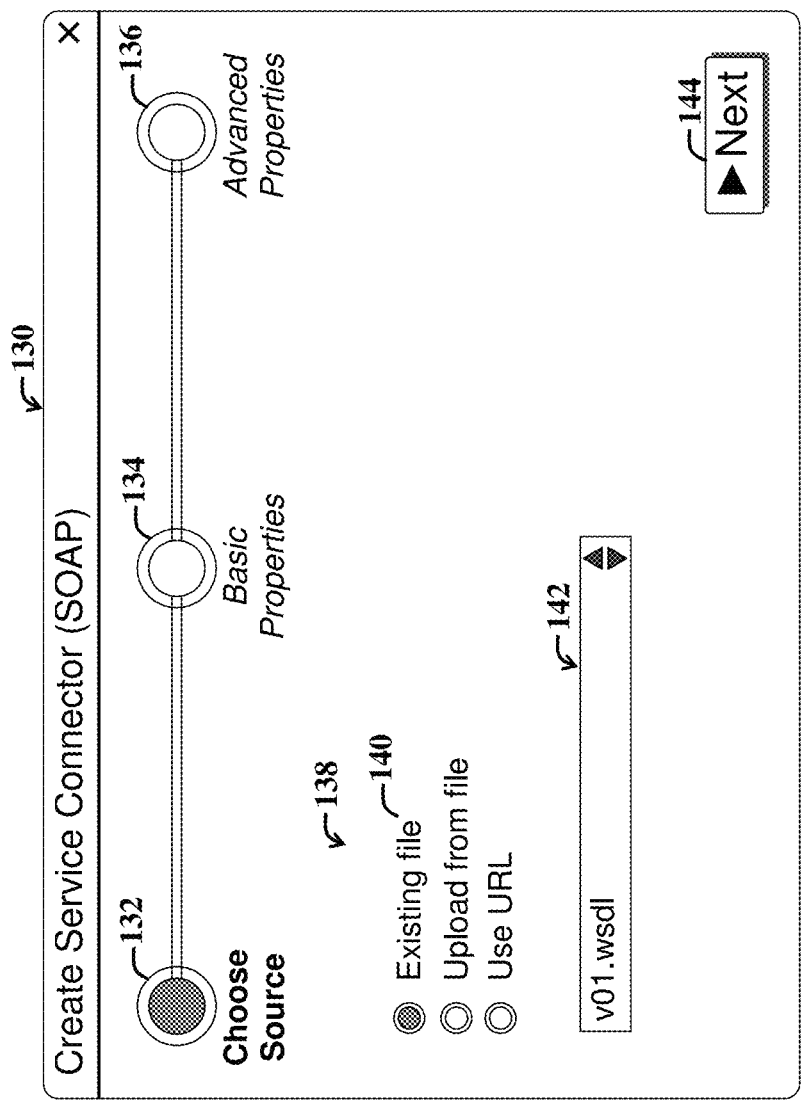
FIG. 5 shows a second example UI display screen, which is accessible via the first UI display screen of FIG. 4, and which represents an example first step of a wizard for creating a Simple Object Access Protocol (SOAP) connector.

FIG. 5 shows a second example UI display screen 130, which is accessible via the first UI display screen of FIG. 4, and which represents an example first step 132 of a wizard for creating an example Simple Object Access Protocol (SOAP) connector. The second example UI display screen 130 shows that the present wizard includes three steps 132-136, including a first source-choosing step 132 for choosing a source to be used to create the SOAP connector; a second basic-properties step 134 for specifying or configuring basic properties of a for the connector being created, and an advanced-properties step 136 for specifying and/or configuring additional properties for the connector.

Note that the source-choosing step 132 is the current step. Accordingly, the current UI display screen 130 displays various UI controls 138 for selecting a source used to access data to be used for the connector. The data may include specifications of a service interface to be used by an existing connector, where the specifications are included in an existing locally stored file; may include specifications pertaining to a portion of a file to be uploaded; or may include specifications accessible via a URL, etc.

In the present example embodiment the user has chosen to use an existing file upon which to base the connector, e.g., as indicated by user selection of an existing-file UI control 140. Upon user selection of the existing-file UI control 140, an additional file-selection UI control 142 is displayed for enabling a user to select a file to be used by the connector under construction.

In the example of FIG. 5, the user has selected an existing WSDL file (i.e., "v01.wsdl"), via the file-selection UI control 142, for use with the SOAP connector under construction. Note that the selected WSDL file may include a description of a particular service interface for a service that the connector will connect to on behalf of a process step to be associated with the connector. Note that if the user had selected another option, e.g., to upload connector-related data from a file stored on a network or to use a URL to access content of the connector-related data, that one or more additional different UI controls may be displayed in place of the file-selection drop down control 142.

In the present example embodiment, after the user has selected a WSDL file via the file-selection drop down control 142, the user selects a next control 144 to proceed to the subsequent basic-properties step 134 of the associated wizard. A third UI display screen 150 is then displayed, as shown in FIG. 6.

Figure 6:
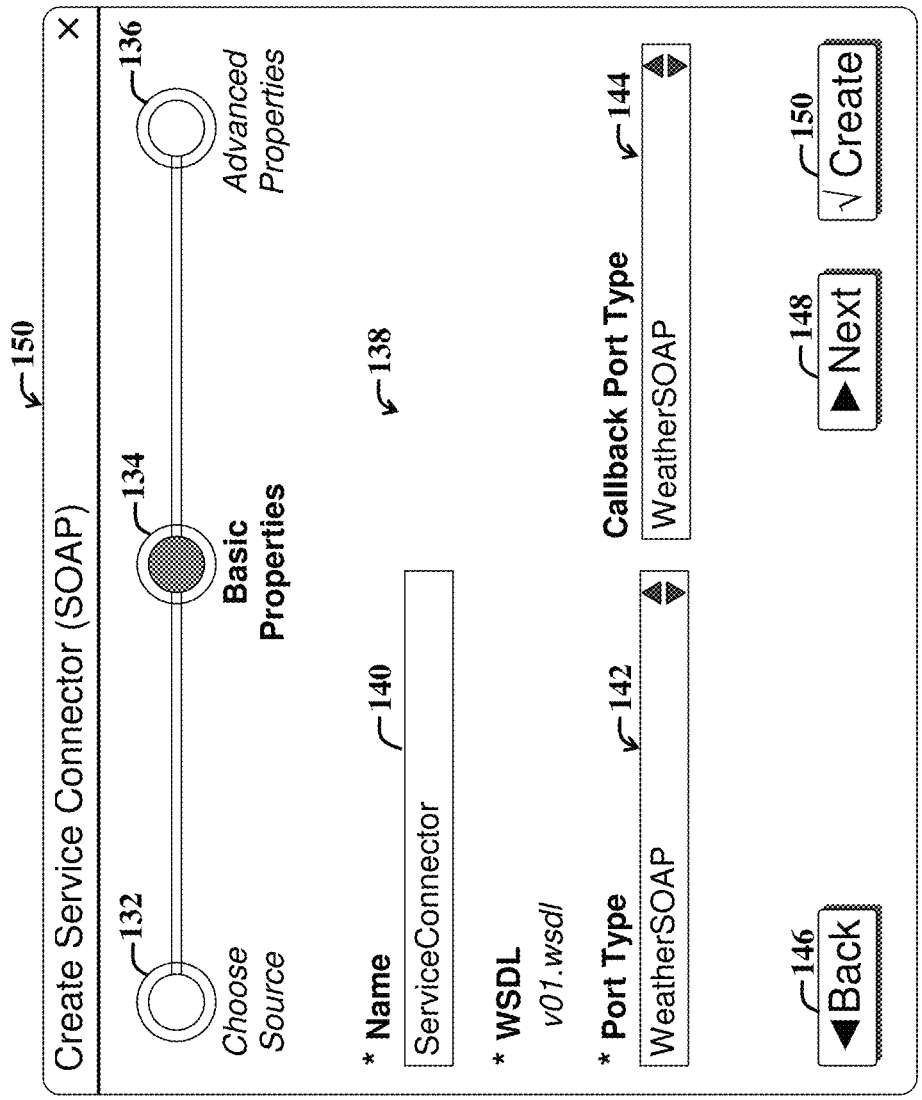
FIG. 6 shows a third example UI display screen, which represents an example second step of the wizard for creating a SOAP connector.

FIG. 6 shows the third example UI display screen 150, which represents an example second step of the wizard for creating an example SOAP connector. Note that the basic-properties step 134 is currently highlighted. Accordingly, various UI controls 138 (displayed in the third UI display screen 150) include UI controls 140-144 for selecting and/or specifying basic properties for the SOAP connector under construction.

The example basic properties include a connector name, as may be specified via a name field 140; a port type, as may be specified using a port-type drop down control 142; and a callback port type, as may be selected via a callback port type drop down control 144. In the present example embodiment, the user has named the connector "ServiceConnector," as shown in the name field 140. The port type and callback port type are set to "WeatherSOAP," as selected using the corresponding drop-down controls 142, 144. Note that the name of a service connector, the port type, and callback port type are implementation specific and may vary depending upon the needs of a given implementation.

Additional controls 146-150, including a back button 146, a next button 148, and a create button 150 are also included in the third example UI display screen 150. After the user has finished interacting with the basic properties controls 138, the user may select the create button 150 to have a connector with the specified parameters automatically generated based on the inputs provided in the first step 132 and second step 134 of the associated connector construction wizard (e.g., corresponding to the connector construction wizard of FIG. 2).

Alternatively, the user may optionally select the next button 148 to proceed to an additional UI display screen for specifying or configuring additional advanced properties for the connector under construction. Similarly, the back button 146 enables navigation back to the first step 132 of the underlying wizard, thereby providing a user option to select a different source than the one currently selected (e.g., different than the selected "v01.wsdl" file).

Figure 7:
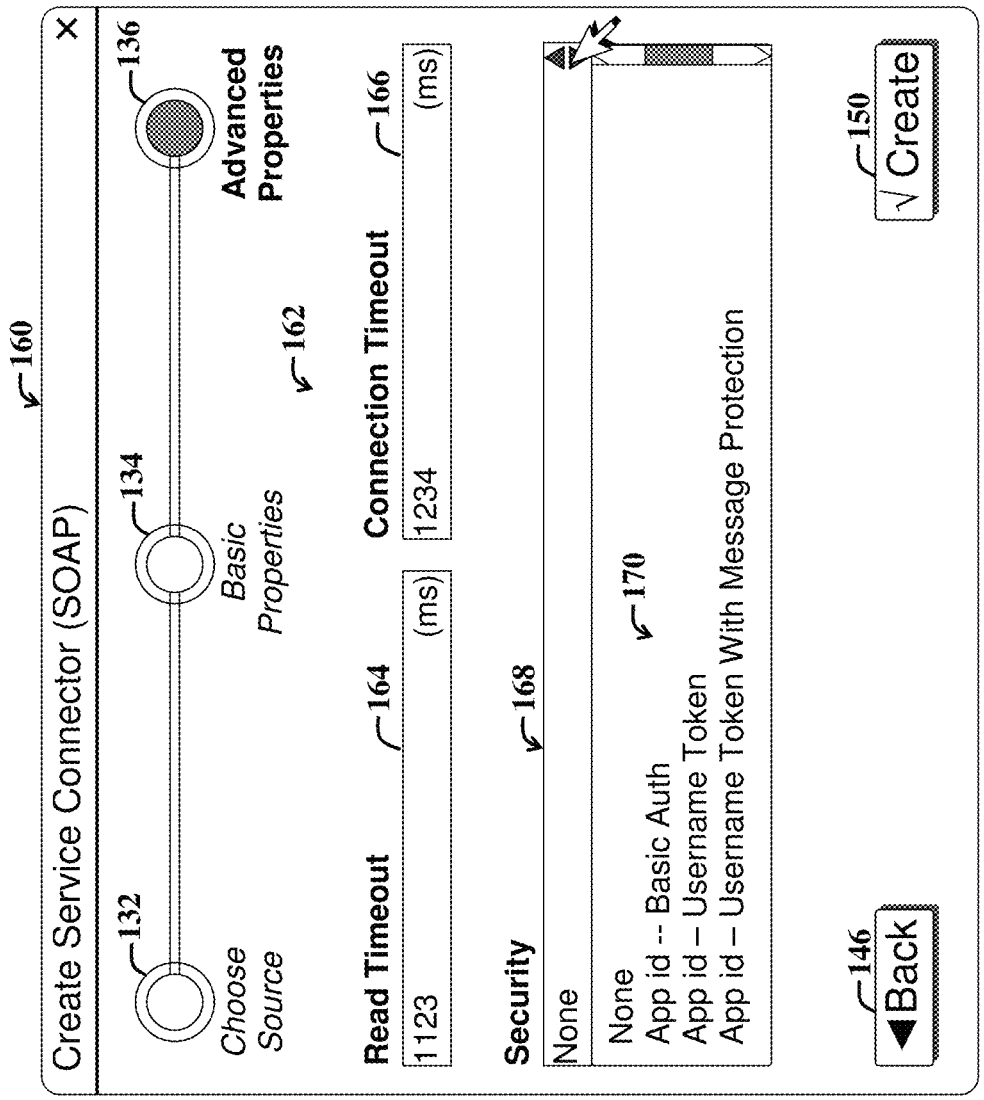
FIG. 7 shows a fourth example UI display screen, which represents an example third step of the wizard for creating a SOAP connector.

FIG. 7 shows a fourth example UI display screen 160, which represents an example third step 136 of an underlying wizard for creating a SOAP connector. The fourth UI display screen 60 includes various advanced-properties controls 162 for enabling a user to specify or configure additional connector properties. The advanced-properties controls 162 include a read timeout field 164 for specifying a read timeout value (i.e., a duration for implementation of a read operation before the operation is terminated); a connection timeout field 166 for specifying a connection timeout (i.e., a duration for a connection to remain absent activity before the connection is terminated); and a security drop down control 168 for selecting a security type and associated settings.

The example security drop down control 168 includes a listing 170 of various types of authentication usable by a connector to connect to a particular SOAP service. In practice, the type of security selected from the listing 170 for a given connector is based upon the security type used by the service to be connected to. For example if the SOAP connector under construction is to connect to SOAP services that use basic authentication (i.e., "Basic Auth"), then the user may preferentially select the "Basic Auth" option from the listing 170.

Upon user selection of one of the security types from the listing 170, additional controls or fields may appear to enable the user to further specify any additional parameters used for the selected security type. For example, if the user selects the "Basic Auth" option from the listing 170, additional fields for entering keystore credentials, username, and password may appear in the UI display screen 160. The user may then enter the appropriate credentials applicable to a service that the connector under development will connect to.

After user manipulation of the advanced-properties controls 162 as desired, the user may select the back button 172 to return to the previous basic-properties step 134 of the underlying wizard, or the user may select the create button 150 to trigger automatic generation of a connector in accordance with the entries specified during completion of the wizard steps 132-136. In the present example embodiment, the resulting created connector then becomes accessible, e.g., via a tile, tab, or other connector UI control, that will be displayed in the connectors section 128 of FIG. 4 when the user navigates back to the connectors section 128.

The displayed connector UI control may also provide user options (e.g., via right-click functionality) to launch additional dialog boxes or windows to initiate edits or configuration changes to the saved connector; to delete the connector, and so on. The created connector also becomes available and readily accessible to the user and/or other users for use in development or design of process-based software applications. The created connector may be stored both among the connectors of the connectors section 128 of FIG. 4, and in the connectors catalog 66 of FIG. 2.

Figure 8:
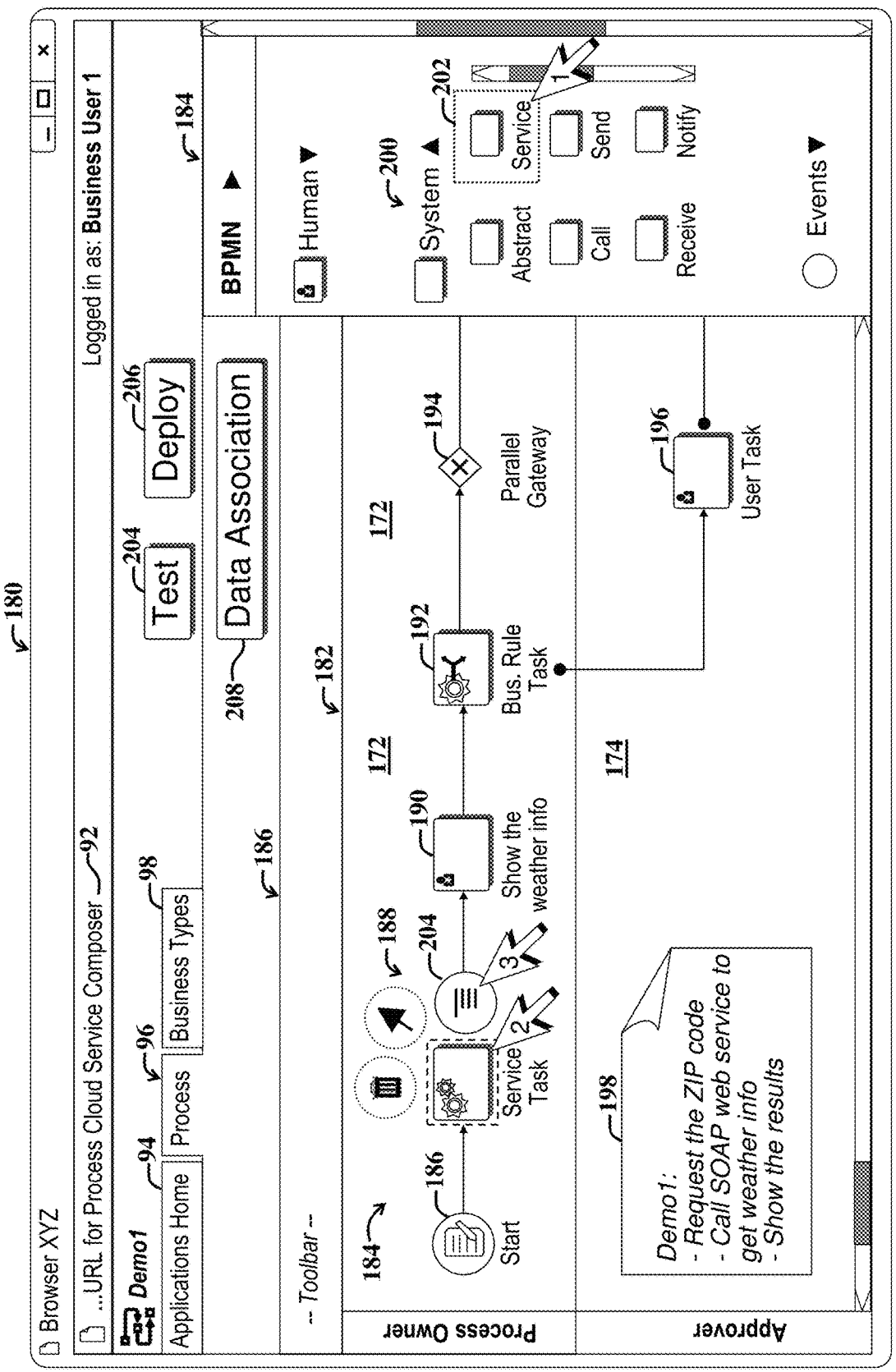
FIG. 8 shows a fifth example UI display screen, which represents a process-editing screen, which provides user options to drag and drop a service task into a BPMN representation of a process-based software application, and to then access one or more additional UI display screens for selecting and configuring connectors for facilitating implementing the service task.

FIG. 8 shows a fifth example UI display screen 180, which represents a process-editing screen for editing a process-based software application and associated processes and sub-processes. The fifth example UI display screen 180 provides functionality enabling a user to drag and drop a service task 202 into a BPMN representation 184 of a process-based software application, and to then access one or more additional UI display screens (e.g., via an option that is selectable from a menu that may be displayed in response to the user selecting a task, such as the service task 188, and then selecting a properties control 204 for the service task 188) for selecting and configuring connectors for facilitating implementing the service task 188.

The fifth example UI display screen 180 is accessible via the first UI display screen 90 of FIG. 1 after user selection of the process tab 96 thereof. The process tab section 96 includes a toolbar 186 with various controls (not shown) that may be applicable to various items 184-198 of the accompanying flow section 182. Examples of tools that may be included in the toolbar section 186 include zoom in and zoom out controls (for expanding or shrinking a displayed process flow 184), a print control for printing a representation of the process flow 184, and so on.

The flow section 182 shows an example BPMN flow 184 (also called a process flow herein) that represents an example process-based software application under development. The process flow 184 is partitioned into swim lanes, e.g., a process owner swim lane 172 and an approver swim lane 174. Process owner flow elements include a start element 186 (also called a start event), a first service task element 188 (also called a service activity), a second service task element 190, a business rule task 192, and a parallel gateway 194. A user task 196 is shown as part of the approver swim lane 174 and represents a user task. The approver swim lane 174 includes notes section 198, whereby the approver may read and enter notes.

A BPMN flow element section 184 is positioned adjacent to the flow section 182 and includes various UI controls, including system UI controls 200. The example system UI controls 200 include various controls that may be dragged and dropped from the BPMN flow element section 184 into desired positions in the process flow 184 under development.

In an example scenario, a user selects a service task control 202 (from among the system controls 200 of the BPMN flow element section 184); then drags and drops the selected flow element (i.e., service task corresponding to the service task control 202) into the process flow 184, resulting in the appearance of the corresponding service task 188 in the process flow 184.

A user may then access properties of the newly positioned service task 188 to facilitate selecting one or more connectors for use with the service task 188, and optionally, for configuring the selected connector(s). To access the properties for the service task 188, an associated properties control 204 is selectable. Alternatively, or in addition, a user may access additional menus and options by right-clicking the service task 188, double-clicking the service task 188, and so on. Note that the exact arrangements, types, and ways to navigate among various UI controls, dialog boxes, and so on, is implementation specific and may vary, depending upon the needs of a given implementation.

Note that data associations for various flow elements, e.g., the service task 188, may be configured via a set of UI display screens that may appear in response to user selection of a data-association button 208 in the process tab section 96. Furthermore, a deploy button 206 may be selected to launch a wizard or other UI mechanisms to facilitate deploying the software application represented by the process flow 184. Additionally, a test button 204 enables user access to software functionality for testing the process flow 184.

Note that the testing environment may be implemented using a local cloud, e.g., a cloud running the application development systems 14 that incorporates the testing environment and connectors framework 16. The deployment environment may include the local cloud and/or one or more external clouds. The deployment environments (to which the process-based software application described by the process flow 184 are deployed) and accompanying deployed applications may communicate with the connectors framework 16 of FIG. 2 to facilitate use of functionality (e.g., connector implementation functions 24 of FIG. 2) by the deployed software application (represented by the process flow 184) and accompanying process steps and associated connectors.

Figure 9:
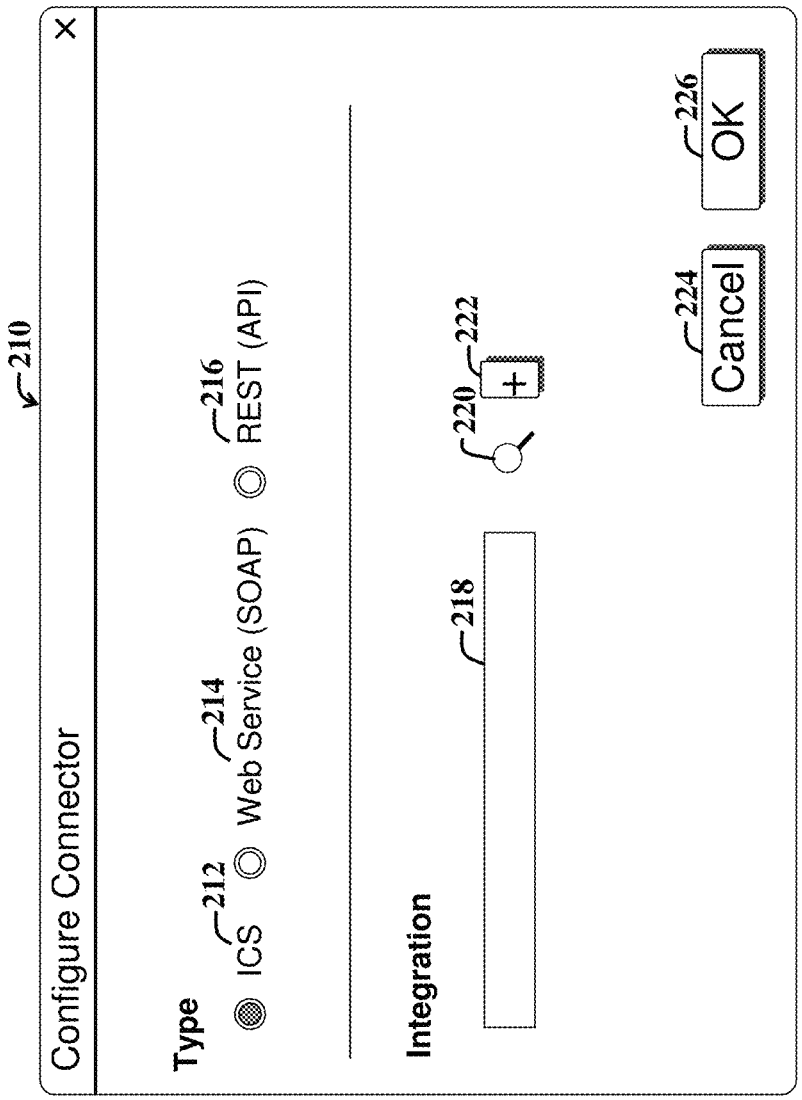
FIG. 9 shows a sixth example UI display screen, which is accessible via the fifth example UI display screen of FIG. 8, and which includes UI controls for selecting a connector type and a particular connector of the selected type for use in implementing the service task of FIG. 8.

FIG. 9 shows a sixth example UI display screen 210, which is accessible via the fifth example UI display screen 180 of FIG. 8, and which includes UI controls 212-216 for selecting a connector type (e.g., ICS integration 212, SOAP web service 214, REST API 216) and UI controls 218-222 for specifying a particular connector of the selected type for use in implementing the service task 188 of FIG. 8.

In the present example scenario, the user has selected the ICS connector option 212. User selection of the ICS connector option 212 results in display of the additional UI controls 218-222. The additional UI controls 218-222 include a field 218 for enabling the user to enter the name of the ICS connector; a search control 220 to enable searching for an existing connector; and an add button 222 for triggering display of additional UI display screens with controls for further creating, defining, and/or adding a particular ICS connector for use with the selected process step 188 of FIG. 8.

If the user had selected the web service option 214, different controls may appear below the controls 212-216, where the different controls are particularly applicable to web service or SOAP connectors. Similarly, user selection of the REST connector option 216 may result in display of additional or different controls as may be applicable to adding and/or configuring REST connectors for use with the selected process step 188 of FIG. 8. The exact types of controls provided are implementation specific and may vary depending upon the needs of a given implementation. Additional controls 224, 226 enable cancelling or accepting the selections and specifications made using the sixth example UI display screen 210.

Figure 10:
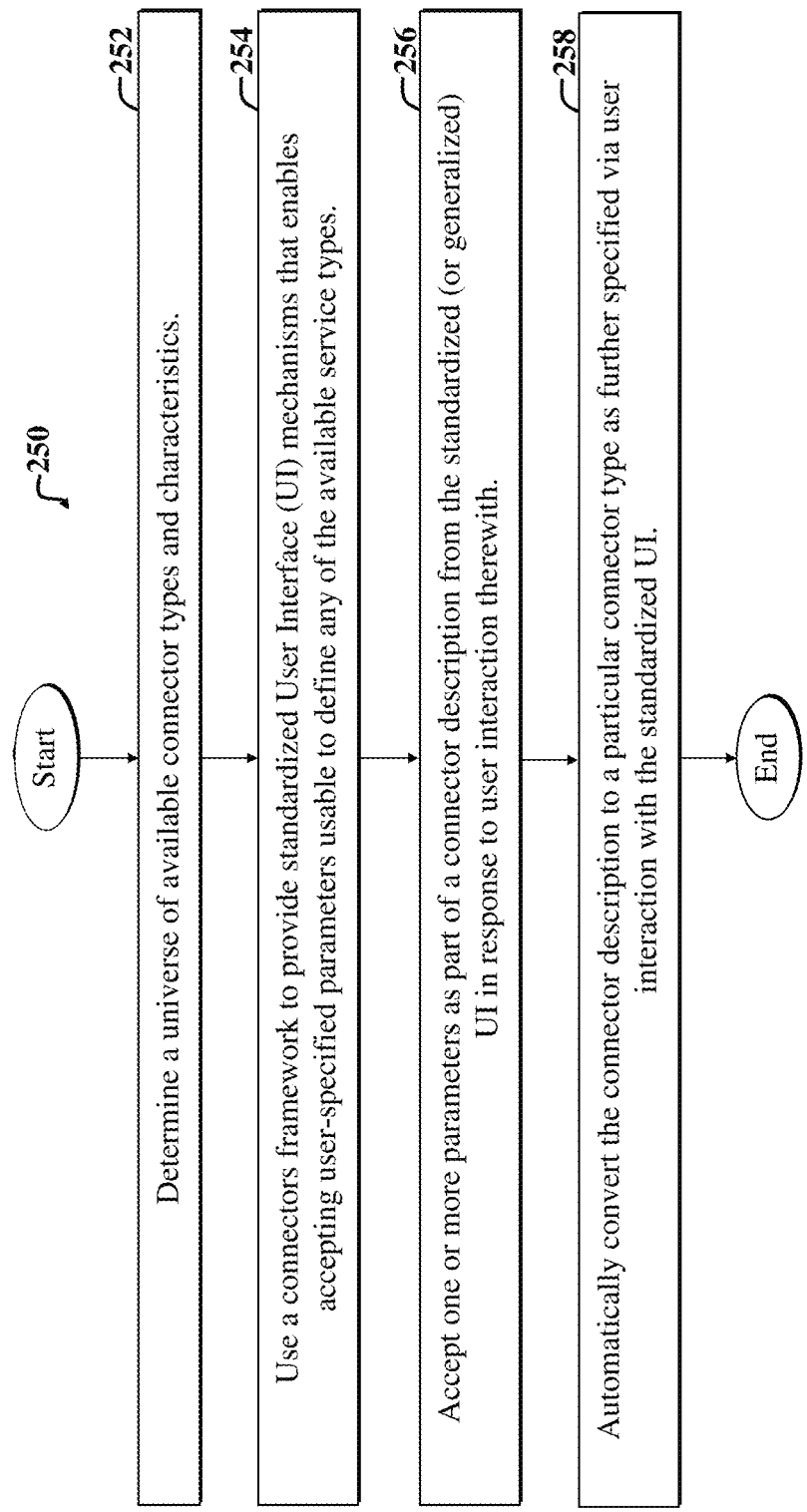
FIG. 10 is a flow diagram of a first example method implementable via the embodiments of FIGS. 1-9.

FIG. 10 is a flow diagram of a first example method 250 implementable via the embodiment of FIGS. 1-3. The example method 250 facilitates enabling users to develop and interact with (e.g., customize, configure, etc.) connectors to be implemented in a computing environment.

The example method 250 includes a first step 252, which involves determining a universe of available connector types and characteristics. Examples of potentially available (depending upon the requirements of a given implementation) connector types includes Integration Cloud Services (ICS), SOAP, and REST connector types. A connector type corresponds to the type of service that the connector is used to connect a process step to.

Examples of user options to initiate construction of connectors of different types are shown in FIG. 4. For example, the ICS integration-creation control 116 of FIG. 4 enables activation of a wizard for creating ICS type connectors for connecting to ICS services or APIs. User selection of the SOAP connector control 118 enables activation of a wizard for creating a connector for connecting to a SOAP service. Similarly, user selection of the REST connector control 120 of FIG. 4 enables activation of a wizard for creating a connector for connecting to a REST service or API.

The universe of available connector types may represent all connector types supported by a particular implementation. Note that different connector types (e.g., different REST connectors, ICS connectors, etc.) may employ different definition structures and accompanying interface description languages, which may be automatically accounted for by the system 10 of FIG. 1 and system 30 of FIG. 2, and the accompanying connectors framework 16 and editor(s) 22.

With reference to FIGS. 2 and 4, in the present example embodiment, the universe of available connector types and characteristics includes the types of predefined connectors stored in the connectors catalog 66. Connectors in the connectors catalog 66 may have been previously been created, i.e., defined by one or more users of the application development editor functionality 50 of FIG. 2. Examples of UI display screens and associated controls for creating and specifying configuration parameters for an example SOAP connector are shown in FIGS. 5-7.

In certain embodiments, the universe of available connector types includes a first type of connector for connecting to a SOAP service 60 of FIG. 2; a second type of connector (REST connector) for connecting to a REST API or REST web service of FIG. 2; and a third type of connector for connecting to an Integration Cloud Services (ICS) type of service 64 of FIG. 2. Note, however, that embodiments are not required to have connectors for connecting to all of such types of services. Instead, the "universe of available types" may include one or more types of web services and/or APIs.

Note that a user of the application development editor functionality 50 of FIG. 2 may also access functionality for browsing the Internet or otherwise conducting searches for available services (e.g., as shown via example search control 220 in FIG. 9) that can be used to fulfill the needs of a particular step in the process flow 72 under development. FIG. 8 shows a more detailed example of a portion of another process flow 184, including example steps 184-196, including a service task 188 that uses a connector to communicate with a service to be called by the service task 188 using the connector that has been assigned to the service task 188.

With reference to FIG. 10, a second step 254 includes using a connectors framework (e.g., the connectors framework 16 of FIGS. 1 and 2) to provide one or more standardized UI mechanisms (e.g., as provided in UI display screens for different wizard steps, as exemplified in FIGS. 5-7) that enable accepting user-specified parameters usable to define any of the available service types. With reference to FIG. 2, example standardized UI mechanisms for defining available service types (through use of connectors), include the connector configuration wizard 44, connector framework configuration functionality 54, and configuration wizard UIs 34; and the connector construction wizard 48, connector framework construction functionality 56, and client-side connector construction wizard UIs 38.

The standardized UI mechanisms may further include similar UI controls and flows for user interaction with different connector types. The UI controls may be rendered using the editor(s) 22 of FIGS. 1 and 2 and accompanying developer system(s) 12. Note that the term "standardized UI mechanisms" as used herein simply refers to a mechanisms that use or share a similar or consistent set of principles required to set up a connector to a service, despite what type of service is to be connected to (e.g., SOAP service, REST API, etc.).

A third step 256 includes accepting one or more parameters as part of a connector description from the standardized (or generalized) UI or UI model (e.g., as exemplified by the example UI display screens 90, 130, 150, 160, 180 of FIGS. 4-8) in response to user interaction therewith. The parameters (e.g., timeout values, security type and parameters, etc.) may be obtained from user input to one or more fields or interaction with other UI controls of one or more dialogs provided as part of a UI of the editor(s) 22 and accompanying development system(s) 14 of FIGS. 1 and 2. For example, FIG. 7 shows various controls and associated options 164-170 for specifying parameters applicable to an example SOAP connector to be constructed or otherwise configured.

Note that the standardized or generalized UIs (collectively represented by numeral 20 in FIGS. 1 and 4) provides relatively uniform or similar UI features, components, and flows for different user interactions with different connector types. For the purposes of the present discussion, two UIs and/or associated UI display screens and or sequences of UI display screens (e.g., wizards) are said to be similar if they share UI architectures (also called UI models herein) or otherwise populate similar or analogous configuration fields and/or parameters fields for each different type of connector, regardless of connector type.

For the purposes of the present discussion, a user interface architecture may be any framework or set of rules or guidelines employed to render a user interface display screen or portion thereof. A UI architecture may, for example, specify a method and/or organization (e.g., organization of user interface controls and associated functionality) for enabling or facilitating user interaction with a software application. The terms "user interface architecture," "user interface framework," and "user interface model" may be employed interchangeably herein.

A fourth step 258 includes automatically converting the connector description to a particular connector type as further specified via user interaction with the standardized UI, e.g., in response to user selection of the create button 150 of FIG. 7. Automatic conversion of the connector description, e.g., as output from the connector construction wizard UIs 38 of FIG. 2, may involve use of the connector implementation functions 24 of the connectors framework 16 of FIG. 3 and accompanying connector catalog generation functionality 58, which together facilitate automatically saving connector definitions and associated configurations in the connectors catalog 66. Note that the connectors catalog 66 is accessible to the connector and application editors 22 of FIG. 2.

Note that the method 250 may be altered without departing from the scope of the present teachings. For example, the method 250 may further specify a step that includes using the connectors framework (e.g., framework 16 of FIGS. 1 and 2) to provide a process cloud services designer (e.g., developer or other user) to trigger calling of and communication with one or more connectors (that represent one or more outbound services) using a set of one or more UI controls that appear similarly regardless of the service type of the one or more connectors. Examples of UI display screens accessible via an example process cloud services designer or composer (as may be displayed in a browser, e.g., the browser 32 of FIG. 2) are shown in FIGS. 4-9.

The example method 250 may further include providing one or more UI controls in connection with a connectors editor (e.g., the editor(s) 22 of FIG. 2) for managing (e.g., creating, editing, deleting, etc.) any connector that is part of the determined universe of available connector types and characteristics, wherein the one or more UI controls are presented such that a similar user experience is provided to browse and view connectors of different connector types and to view connector structures. The UI controls and UI display screens also facilitate browsing web services and/or APIs used by a connector and its associated structure to exchange information for a particular connector of a connector type that is part of the universe of available connector types.

For the purposes of the present discussion, a connector structure may be any connector architecture, e.g., as may be exemplified by a REST flat structure as discussed more fully in the U.S. patent application referenced above, entitled "GENERIC-FLAT STRUCTURE REST API EDITOR.". Another example of a simplified connector structure is shown in FIG. 3. The example connector structure 80-86 of FIG. 3 includes various grouped parameters 80 and separate set of core connector functionality and associated operations 86.

The example method 250 may further include employing the connectors framework (e.g., the connectors framework 16 of FIG. 2) to link to one or more connector editors (e.g., the editors 22 of FIG. 2) and associated dialogs (e.g., dialog boxes of FIGS. 6-7 and FIG. 9) to enable user customization and configuration of any available connector of an available connector type for a given purpose. One or more additional UI controls (e.g., represented by the connector configuration wizard UI display screens 34 of FIG. 2) may enable user configuration of the available connector using a similar life cycle. In the present example embodiment, connectors grouped within the connectors catalog 66 of FIG. 2 for a particular user share a similar lifecycle.

The example method 250 may further specify that the UI mechanisms (e.g., corresponding to the different wizards 44-50 of FIG. 1, and exemplified by UI controls presented in FIGS. 5-7) represent a common UI, i.e., UIs implemented via one or more wizards that share a similar UI model regardless of the connector type (e.g., REST type, SOAP type, ICS type, etc.) associated with each of the one or more wizards.

For the purposes of the present discussion, a UI model may be any UI architecture. A UI architecture may be any framework or set of rules or guidelines employed to render a UI display screen or portion thereof. A UI architecture may, for example, specify a method and/or organization (e.g., organization of user interface controls and associated functionality) for enabling or facilitating user interaction with a software application. The terms "user interface architecture" and "user interface model" may be employed interchangeably. However, a user interface framework, as the term is used herein may further include any descriptions and accompanying computer code for rendering a UI display screen in accordance with a set of criteria specifying how components of a UI display screen are to be characterized, e.g., sized, positioned, shaped, validated, and so on.

The example method 250 may further include automatically parameterizing the connector to use different data when running in different computing environments (e.g., test and production computing environments).

Figure 11:
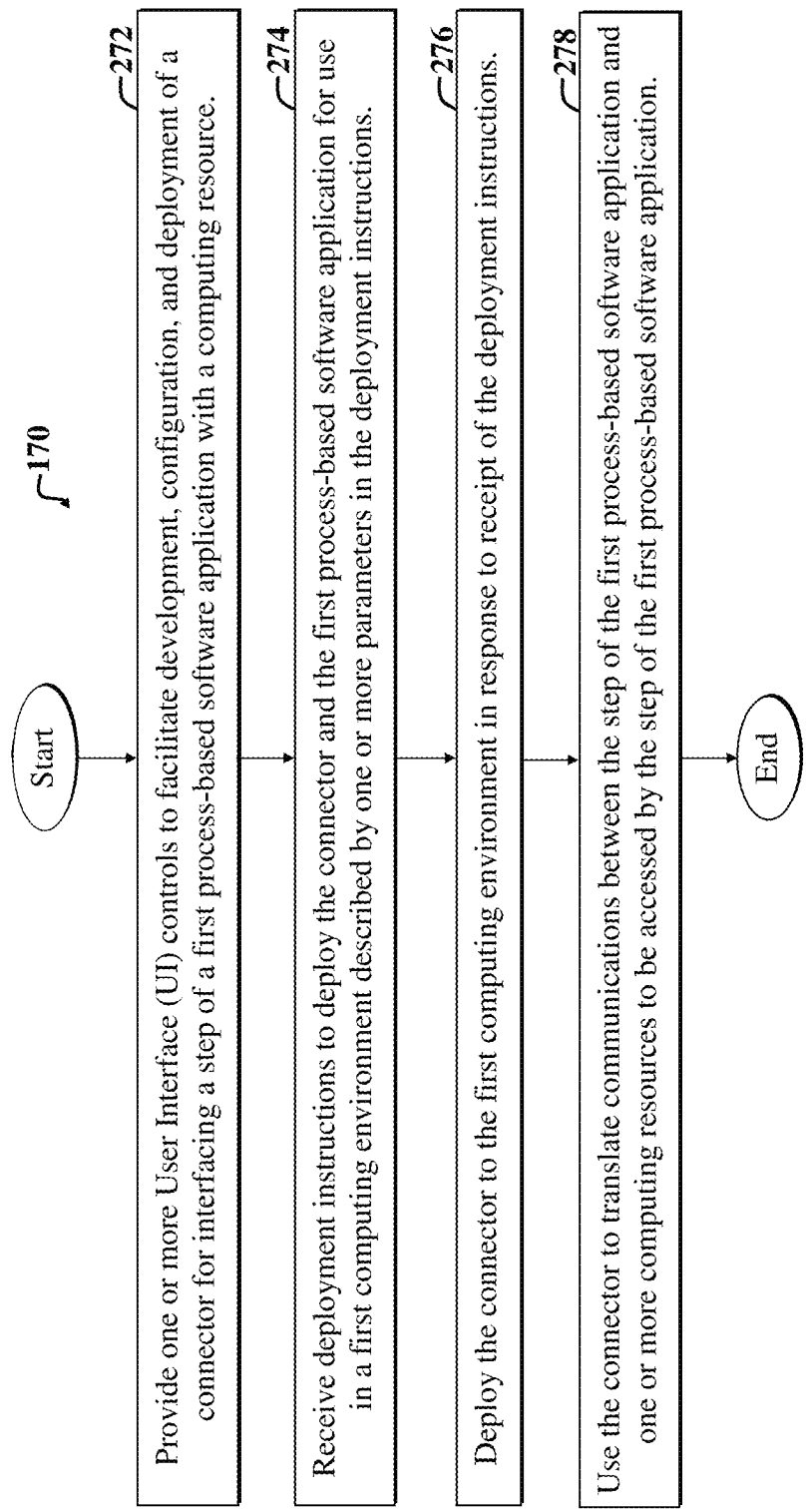
FIG. 11 is a flow diagram of a second example method implementable via the embodiments of FIGS. 1-10.

FIG. 11 is a flow diagram of a second example method 270 that is implementable via the embodiments of FIGS. 1-10. Note that while the connectors framework 16 of FIGS. 1-2 includes functionality 24, 54-58 that facilitates connector development and configuration, that use of the connector framework 16 of FIGS. 1-2 is not limited thereto. For example, with reference to FIG. 2, the connectors framework 16 may also facilitate supporting service calls made by flow steps 72 of process-based software applications 70 using connectors 52 corresponding to (i.e., configured to interface with) the services that are called. FIG. 8 shows additional examples of steps 188-196 of an example process flow 184 describing a process-based software application under development.

Accordingly, the connectors framework 16 of FIGS. 1-2 specializes and links to the specific editor 22 and associated dialogs of the wizards 20 that enable customization and configuration of any connector, but also facilitates enabling process steps to call and communicate with external services during runtime. A specific example of a set of dialogs for a wizard used to create a SOAP connector are shown in FIGS. 5-7.

Consistent with the above, the second example method 270 facilitates integrations between one or more steps (e.g., steps 188-196 of FIG. 8) of a process-based software application (e.g., as represented by the BPMN process flow 184 of FIG. 8) and one or more network resources, e.g., external services (e.g., as represented by the services 18 of FIG. 1). The second example method 270 includes an initial UI-control-providing step 272, which includes providing one or more UI controls (e.g., controls represented by the wizards 34-40 of FIG. 2) to facilitate development, configuration, and deployment of a connector for interfacing a step (e.g., the service task 188 of FIG. 8) of a first process-based software application (e.g., the application 70 of FIG. 2 or the application represented by the process flow 184 of FIG. 8) with a computing resource (e.g., as an example, the weather database resource 68 of FIG. 2), e.g., via one or more web services and/or APIs 60-64 of FIG. 2.

A second deployment-receiving-instructions step 274 includes receiving deployment instructions to deploy the connector (e.g., connector(s) 52 of FIG. 2) and the first process-based software application (e.g., application 70 of FIG. 2) for use in a first computing environment described by one or more parameters in the deployment instructions. Note that with reference to FIGS. 2 and 5, the deployment instructions may be received by the connectors framework 16 of FIG. 2 from the deployment wizard 46. The deployment wizard 46 of FIG. 2 may be launched, for example, in response to user selection of the deploy button 206 of FIG. 8.

A third deploying step 276 includes deploying the connector (e.g., the connector 52 and accompanying process-based software application 70 of FIG. 2) to the first computing environment in response to receipt of the deployment instructions. The first computing environment may include, for example, a test environment or a production environment. With reference to FIG. 2, the test environment may be provided by the application development system 14 and associated process cloud upon which the development system 14 runs. The production environment may be represented by one or more servers corresponding to one or more service providers 30 of FIG. 2.

A fourth connector-using step 278 includes using the connector that has been deployed with the process-based software application (e.g., the application 70 of FIG. 2) to the target computing environment to translate communications between the step of the first process-based software application (that was interfaced in the UI-control-providing step 272) and one or more computing resources to be accessed by the step of the first process-based software application.

Note that the second example method 270 may be altered, without departing from the scope of the present teachings. For example, the method 270 may further specify that the first UI-control-providing step 270 further includes storing the developed connector in a catalog (e.g., the connectors catalog 66 of FIG. 2) of reusable connectors. Once stored in the connectors catalog 66, a developer may readily employ one or more of the editors 22 to browse the connectors catalog 66 and select a connector to facilitate implementing another step of the first process-based software application or a another step of another process-based software application.

The second example method 270 may further include using the developed connector to format a request message on behalf of the process step and in accordance with an interface description exposed by the one or more computing resources, e.g., a web service and/or API.

The second example method 270 may further include deploying the connector using a runtime of a connectors framework used to implement the second example method 270. Note that the connectors framework 16 of FIG. 2 may include or otherwise communicate with a runtime that can be used to run the process-based software application 70 and associated connectors 52 in a test environment. Note however, that when the process-based software application 70 and accompanying connectors 52 are deployed to a particular environment, that copies of a saved version of the application 70 and accompanying connectors 52 are deployed, as opposed to the actual application and accompanying connectors 52.

The second example method 270 may further include providing one or more additional UI controls (e.g., via connector configuration wizard UIs 34 and/or deployment wizard UIs 36 of FIG. 2) to enable a user (e.g., developer and/or deployment manager) to configure the connector for use in a second computing environment (e.g., a production environment) to access a second computing resource (e.g., one of the resources accessible via one of the services 60-64 of FIG. 2, which were not allocated for use by the connector when deployed to the first computing environment).

The second example method 270 may further include determining when the process-based software application (e.g., application 70 of FIG. 2) is deployed to the second computing environment, and then providing one or more UI controls to enable a user to change a configuration of the connector to enable the step of the process-based software application to communicate with the second computing resource. This may involve use of JMX (Java Management eXtensions) functionality of the connector implementation functions 24 for hot configurations of running process-based software applications. Alternatively, the connector configuration functions 54 of FIG. 2 are used to enable configuration changes responsive to user interaction with the deployment wizard UI display screens 36 of FIG. 2.

Accordingly, the example connectors framework 16 of FIGS. 1-2 and accompanying method 270 that may be performed thereby, support construction, configuration, implementation, and use of connectors as abstraction interfaces between process activities and services or APIs called by the process activities. The abstraction (also called a layer of abstraction or abstraction layer herein) facilitates simplifying tasks required by a developer or other business user to set up service calls for use by process steps of their process-based software application under development.

For the purposes of the present discussion, a layer of abstraction may be any mechanism for providing a simplifying interface or container, such as by selectively hiding or generalizing implementation details or underlying complexity of something, e.g., to facilitate software development and/or intercommunications between software entities, e.g., process steps, external services, etc. For example, the connectors framework 16 of FIG. 2 includes functionality 24, 54-58 for generalizing or reducing exposed complexity (i.e., exposed to the process developer or other user) of interfaces (e.g., as may be described by WADL files or other interface description mechanisms, depending upon the service type) for external services 18 that are to be called by the process-based software application(s) 70, to thereby facilitate development, configuration, deployment, and use of the process-based software application(s) 70 of FIG. 2. The terms "layer of abstraction," "abstraction layer," and "abstraction" may be employed interchangeably herein.

The abstraction may enable a business user to leverage data and/or functionality offered by external web services, without requiring detailed technical knowledge of each type of external web service to call; what interface specification details must be coded into a service step of a process-based software application, and so on. Accordingly, connector development and allocation for use with a process-based software application can be a seamless experience, regardless of connector type (e.g., ICS, SOAP, REST, etc.).

Note that in general, connectors or services expose operations that the user (e.g., developer) can leverage in their flow (e.g., the flow 72 of FIG. 2). The user merely picks the operation, and views and assign applicable connector(s) to perform an operation for any given process step, e.g., flow element.

Note that connectors maintained in the connectors catalog 66 of FIG. 2 may be conceptually visualized as selectable operations, where the operations to be performed are implemented via web services or APIs called by the connectors. Accordingly, the connectors of the connectors catalog 66 of FIG. 2 essentially interface with services and process steps of process-based software applications. When developing a particular process step for the application 70 of FIG. 2, a developer may merely pick an operation associated with a connector; then the connectors framework 16 and editors 22 will facilitate automatically resolving and implementing the connector for the particular service and associated service type that is to be called by the connector.

Figure 12:
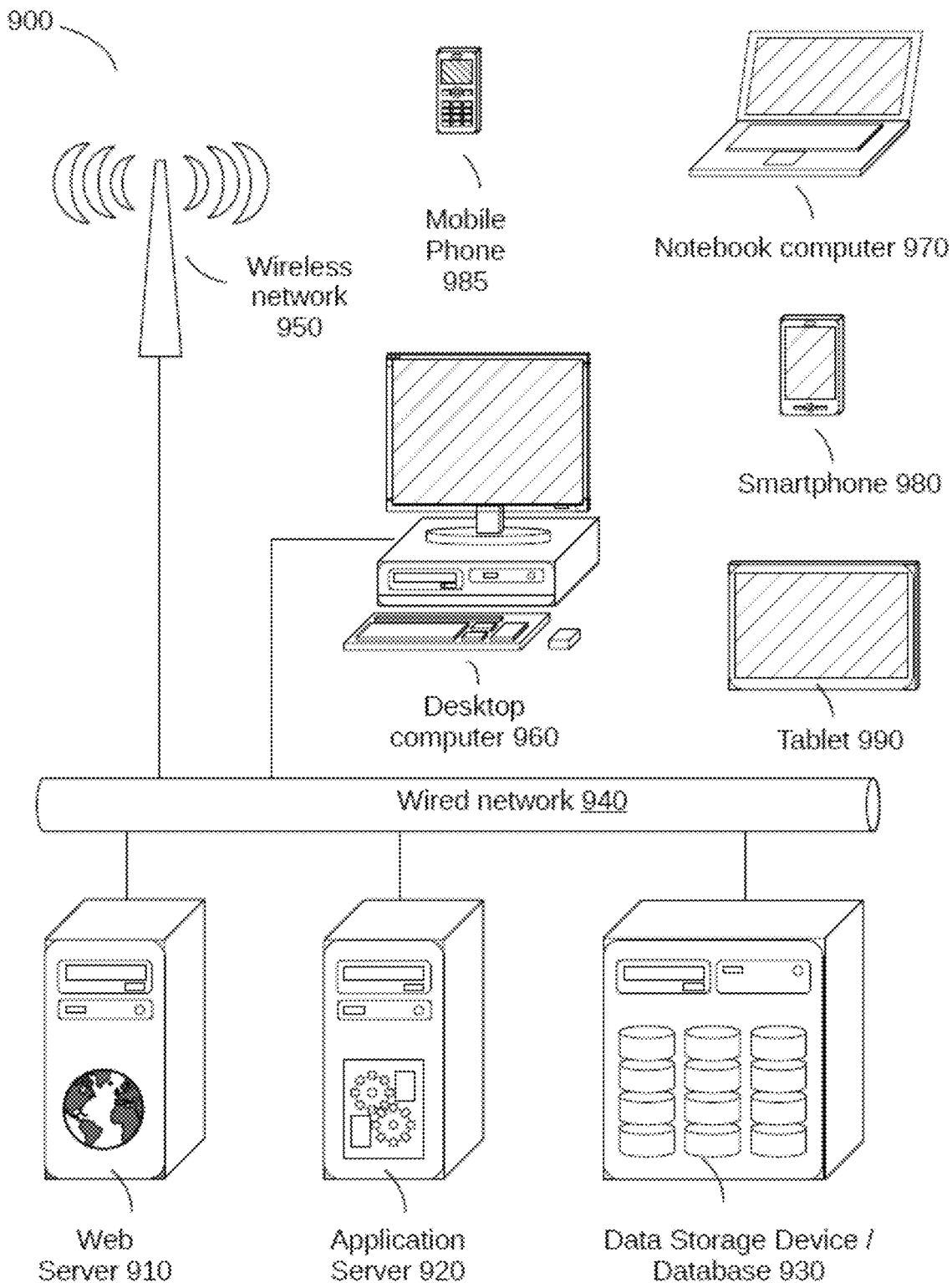
FIG. 12 is a general block diagram of a system and accompanying computing environment usable to implement the embodiments of FIGS. 1-11.

FIG. 12 is a general block diagram of a system 900 and accompanying computing environment usable to implement the embodiments of FIGS. 1-11. The example system 900 is capable of supporting or running various hardware and/or software modules and associated methods discussed with reference to FIGS. 1-11. Note that certain embodiments may be implemented using one or more standalone applications (for example, residing in a user device) and/or one or more web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 2 and 6, the developer system(s) 12 (also called client systems, as they may be used by persons other than a "developer") of FIG. 1 may be implemented in whole or in part via one or more of the desktop computer 960, notebook computer 970, smartphone 980, mobile phone 985, tablet 990, of FIG. 12 and/or other computing devices.

In a particular example embodiment, the computing devices 960-990 run browsers, e.g., used to display the UI display screens 20 and accompanying UI controls of FIG. 2.

In a particular example embodiment, browsers of the developer system(s) 12 of FIG. 2 connect to the Internet, represented by the wired network 940 and/or wireless network 950 as shown in FIG. 12, to thereby access one or more network-coupled servers, databases, and/or associated cloud-based functionality, as represented by the application development systems 14 and connectors framework 16 of FIG. 1.

Examples of process cloud functionality that may be accessed an used by the developer system(s) 12 include process cloud services and accompanying process-based application development functionality 14, 50; process-based software applications 70 and development functionality 50; connector construction functions 56; connector configuration functions 54; browsing of the connectors catalog 66; manipulation of a process flow 72 via application editor functions 50; and so on.

Note that one or more of the web server 910, application server 920, and data storage device or database 930 shown in FIG. 12 may be used to host software corresponding to the modules 14-18, 30, 22, 24, 60-64, 44-68, of FIG. 2, as detailed more fully below.

In the particular example embodiment, process cloud functionality 14, 16 of FIG. 2 run in a cloud computing environment that includes a collection of plural web servers 910, application servers 920, and data storage devices 930 shown in FIG. 12.

For example, in a particular example embodiment, process-based application development functionality 14 (e.g., as may be implemented using a PCS composer) of FIG. 2 runs on a process cloud that communicates with a document cloud via an integration mechanism, e.g., middleware, APIs, web services, etc. The document cloud may maintain data that may otherwise be maintained in the process database (e.g., as may be represented by the process-based software application 70 of FIG. 2) of FIG. 2.

Note that a runtime of the application development systems 14 of FIG. 2, may support running of the process-based software application 70, and may run on one or more application servers 920, as shown in FIG. 12. Furthermore, the runtime may use and access data of the process connectors catalog 66, process-based software application 70, and/ or of a document cloud integrated with the process cloud (wherein the process cloud is represented by the modules 14, 16 in FIG. 2). The connectors catalog 66 and associated storage mechanism for maintaining the process-based software application 70 code may be maintained via one or more of the data storage devices 930 of FIG. 12.

In general, software developers e.g., users of the developer system(s) 12 of FIG. 2, may subscribe to certain cloud services to facilitate development of and use of software applications and storage of associated files. A cloud service that is configured for software application or process flow development and/or implementation is called a PCS herein. A PCS may employ a networked database, e.g., the data storage device 930 of FIG. 12, to store files and other objects used by a given software program being developed.

In general, the example server-side development environments discussed herein may be accessible to developers via browsers. The development environments may be backed by the PCS, such that certain developed software application files are stored in a PCS database (e.g., the connectors catalog 66 of FIG. 2) corresponding to the one or more of the data storage devices 930 of FIG. 12.

In the particular example embodiment, the UI display screens 20 and associated wizard UI display screens 34-40 of the developer systems 12 of FIG. 2 include accompanying UI controls and associated options. Example options include options to browse, create, delete, define, upload, download, etc., specifications for process-based software applications, configuration files, connector specifications, and so on.

Note that in the particular example embodiment, browsers used by the developer system(s) 12 of FIG. 2, interface with web servers 910 shown in FIG. 12 to access websites and accompanying webpage code, which is backed by applications used to implement the modules 44-58 of FIG. 1. The webpage code of the web servers 910 of FIG. 12 use web services, APIs, and/or other interfacing mechanisms to communicate with application software hosted on application servers 920 of FIG. 12 of the cloud, which includes a collection of web servers 910, application servers 920, and data storage devices 930 of FIG. 12.

Note that various embodiments discussed herein may provide substantial benefits in terms of providing efficiencies in systems and methods that achieve a new and useful end as it pertains to new software usability; particularly usability of development environments for process-based software applications that demand a simplified interface for interfacing process steps with external web services and APIs.

In particular, certain embodiments discussed herein uniquely leverage a connectors framework and an accompanying concept of use of a "connector" mechanisms for providing both a simplifying layer of abstraction between process steps and called services, and also consequent functionality enhancements to application and connector configurability, including pre-deployment and post-deployment configurability. The connectors framework abstraction layer also provides functionality for enabling automatic handling of complexities associated with interfacing process steps with various services of different types, which may otherwise require detailed technical knowledge and expertise to interface process steps with.

Figure 13:
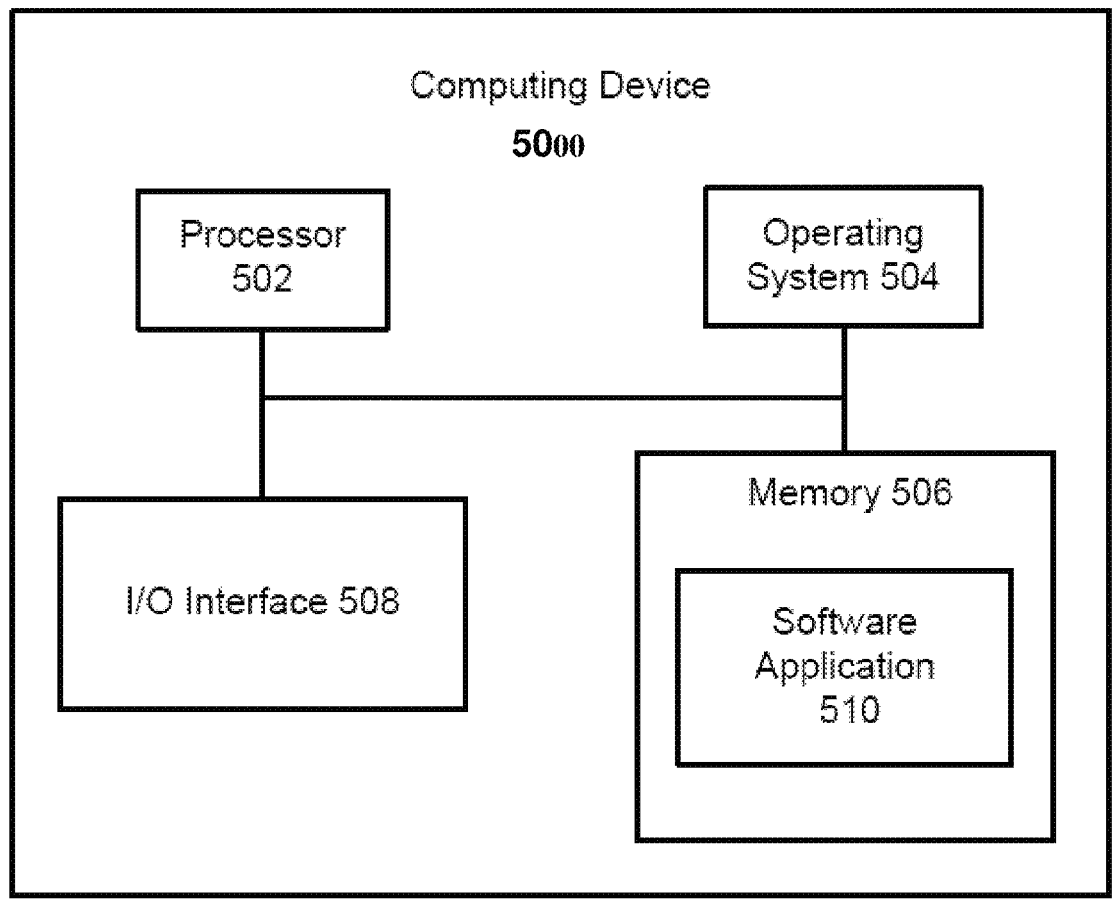
FIG. 13 is a general block diagram of a computing device usable to implement the embodiments of FIGS. 1-12.

FIG. 13 is a general block diagram of a computing device usable to implement the embodiments of FIGS. 1-12. While system 402 of FIG. 13 is described as facilitating performing the steps as described in certain implementations herein, any suitable component or combination of components of system 402 or any suitable processor or processors associated with system 402 may be used for performing the steps described.

FIG. 13 illustrates a block diagram of an example computing system 500, which may be used for implementations described herein. For example, computing system 500 may be used to implement server devices 910, 920 of FIG. 12 as well as to perform the method implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 13 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while certain embodiments discussed herein involve integrating or leveraging functionality of a process cloud, embodiments are not limited thereto. Furthermore, while use of connectors to interface and simplify configuring process steps to call external services that are either SOAP, REST, and/or ICS services and/or APIs, embodiments are not limited thereto. Those skilled in the art with access to the present teachings may readily develop and/or modify a connectors framework and associated computing environment capable of generating and configuring connectors to simplify connections to external services of virtually any type; not just SOAP, REST, ICS, etc.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including instructions executable by one or more processors for performing operations including:
   creating, at a user interface of a connector framework, a process flow that represents a process-based software application by: receiving user specified connector creation information for creating connectors that provide interactions between the process-based software application and services, receiving user specified element information for associating elements with the process flow, wherein one of the elements is a service task, and selecting and configuring a connector, from the connectors, that provides interactions between the process-based software application and a first service during execution in a first computing environment;
   executing the process-based software application in the first computing environment, wherein interactions between the process-based software application and the first service via the connector, and interactions between the process-based software application and the connector framework are provided during the executing of the process-based software application in the first computing environment;
   performing a first modification to the connector after the connector provides the interactions in the first computing environment between the process-based software application and the connector framework during the executing of the process-based software application in the first computing environment;
   in response to detecting deployment from the first computing environment to a second computing environment, enabling interactions between the process-based software application and the second service during execution in the second computing environment instead of the first service by automatically performing a second modification to the connector; and
   executing the process-based software application in the second computing environment, wherein interactions are between the process-based software application and the second service instead of the first service, and are performed via the second modification to the connector during the executing of the process-based software application in the second computing environment, wherein the first computing environment is a test environment and the second computing environment is a production environment.

2. The non-transitory computer readable medium of claim 1, wherein a deployment system includes the test environment.

3. The non-transitory computer readable medium of wherein the operations further include:
   associating code with a connector to provide a layer of abstraction between the process-based software application and a service task during execution of the process-based software application, called services, and associated interfaces.

4. The non-transitory computer readable medium as recited by claim 1, wherein the operations further include:
   parameterizing the connectors to use different data when executing in different environments.

5. The non-transitory computer readable medium of claim 1, wherein the operations further include:
   modifying a connector during execution of the process-based software application in the first computing environment.

6. The non-transitory computer readable medium of claim 1, wherein the operations further include:
   altering, performed by a deployment manager when the process-based software application and associated connector are deployed to the production environment from the test environment, connector configuration parameters to account for differences in how services are consumed in the production environment as opposed to the test environment.

7. The non-transitory computer readable medium of claim 1, wherein the operations further include:
   providing one or more UI controls to facilitate development, configuration, and deployment of a connector for interfacing a step of a first process-based software application with a computing resource;
   receiving deployment instructions to deploy the connector and the first process-based software application for use in the first computing environment described by one or more parameters in the deployment instructions;
   deploying the connector to the first computing environment in response to receipt of the deployment instructions; and
   using the connector to translate communications between the step of the first process-based software application and one or more computing resources to be accessed by the step of the first process-based software application.

8. The non-transitory computer readable medium of claim 1, wherein structures for the connectors are Representational Sate Transfer (REST) Flat Structures.

9. The non-transitory computer readable medium of claim 1, wherein the operations further include:

changing configuration of a connector to enable a step of the process-based software application to communicate with a computing resource accessible via an outbound service, wherein the changing of the configuration is performed when the process-based software application is deployed to the second computing environment.

10. A method for executing a process-based software application in a first computing environment and a second computing environment, the method comprising:

creating, at a user interface of a connector framework, a process flow that represents a process-based software application by: receiving user specified connector creation information for creating connectors that provide interactions between the process-based software application and services, receiving user specified element information for associating elements with the process flow, wherein one of the elements is a service task, and selecting and configuring a connector, from the connectors, that provides interactions between the process-based software application and a first service during execution in a first computing environment;

executing the process-based software application in the first computing environment, wherein interactions between the process-based software application and the first service via the connector, and interactions between the process-based software application and the connector framework are provided during the executing of the process-based software application in the first computing environment;

performing a first modification to the connector after the connector provides the interactions in the first computing environment between the process-based software application and the connector framework during the executing of the process-based software application in the first computing environment;

in response to detecting deployment from the first computing environment to a second computing environment, enabling interactions between the process-based software application and the second service during execution in the second computing environment instead of the first service by automatically performing a second modification to the connector; and executing the process-based software application in the second computing environment, wherein interactions are between the process-based software application and the second service instead of the first service, and are performed via the second modification to the connector during the executing of the process-based software application in the second computing environment, wherein the first computing environment is a test environment and the second computing environment is a production environment.

11. The method of claim 10, wherein a deployment system includes the test environment.

12. The method of claim 10, wherein the operations further include:

associating code with a connector to provide a layer of abstraction between the process-based software application and a service task during execution of the process-based software application, called services, and associated interfaces.

13. The method as recited by claim 10, wherein the operations further include:

parameterizing the connectors to use different data when executing in different environments.

14. The method of claim 10, wherein the operations further include:

modifying a connector during execution of the process-based software application in the first computing environment.

15. The method of claim 10, wherein the operations further include:

altering, performed by a deployment manager when the process-based software application and associated connector are deployed to the production environment from the test environment, connector configuration parameters to account for differences in how services are consumed in the production environment as opposed to the test environment.

16. The method of claim 10, wherein the operations further include:

providing one or more UI controls to facilitate development, configuration, and deployment of a connector for interfacing a step of a first process-based software application with a computing resource;

receiving deployment instructions to deploy the connector and the first process-based software application for use in the first computing environment described by one or more parameters in the deployment instructions;

deploying the connector to the first computing environment in response to receipt of the deployment instructions; and using the connector to translate communications between the step of the first process-based software application and one or more computing resources to be accessed by the step of the first process-based software application.

17. The method of claim 10, wherein structures for the connectors are Representational Sate Transfer (REST) Flat Structures.

18. An apparatus for executing a process-based software application in a first computing environment and a second computing environment, the apparatus comprising:

one or more processors;

a tangible processor-readable storage device including instructions for:

creating, at a user interface of a connector framework, a process flow that represents a process-based software application by: receiving user specified connector creation information for creating connectors that provide interactions between the process-based software application and services, receiving user specified element information for associating elements with the process flow, wherein one of the elements is a service task, and selecting and configuring a connector, from the connectors, that provides interactions between the process-based software application and a first service during execution in a first computing environment;

executing the process-based software application in the first computing environment, wherein interactions between the process-based software application and the first service via the connector, and interactions between the process-based software application and the connector framework are provided during the executing of the process-based software application in the first computing environment;

performing a first modification to the connector after the connector provides the interactions in the first computing environment between the process-based software application and the connector framework during the executing of the process-based software application in the first computing environment;

in response to detecting deployment from the first computing environment to a second computing environment, enabling interactions between the process-based software application and the second service during execution in the second computing environment instead of the first service by automatically performing a second modification to the connector; and executing the process-based software application in the second computing environment, wherein interactions are between the process-based software application and the second service instead of the first service, and are performed via the second modification to the connector during the executing of the process-based software application in the second computing environment, wherein the first computing environment is a test environment and the second computing environment is a production environment.

* * * * *